(12) United States Patent
Nagasawa

(10) Patent No.: US 11,427,448 B2
(45) Date of Patent: Aug. 30, 2022

(54) CONVEYING APPARATUS

(71) Applicant: TOYOTA JIDOSHA KABUSHIKI KAISHA, Toyota (JP)

(72) Inventor: Katsuhiko Nagasawa, Aichi-ken (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 540 days.

(21) Appl. No.: 16/574,583

(22) Filed: Sep. 18, 2019

(65) Prior Publication Data

US 2020/0109038 A1 Apr. 9, 2020

(30) Foreign Application Priority Data

Oct. 4, 2018 (JP) .............................. JP2018-188827

(51) Int. Cl.
*B66F 9/075* (2006.01)
*G06T 7/70* (2017.01)
*B66F 9/20* (2006.01)
*G06T 7/60* (2017.01)

(52) U.S. Cl.
CPC .............. *B66F 9/0755* (2013.01); *B66F 9/20* (2013.01); *G06T 7/60* (2013.01); *G06T 7/70* (2017.01)

(58) Field of Classification Search
CPC ...... G06T 7/60; G06T 7/70; B66F 9/20; B66F 9/0755
See application file for complete search history.

(56) References Cited

U.S. PATENT DOCUMENTS

| | | | |
|---|---|---|---|
| 2005/0244259 A1* | 11/2005 | Chilson .................. | G05D 1/027 414/664 |
| 2017/0243369 A1* | 8/2017 | Iida ........................... | G06T 7/60 |
| 2017/0285644 A1* | 10/2017 | Ichinose ............... | B66F 9/0755 |
| 2018/0089517 A1* | 3/2018 | Douglas ................. | G06T 7/593 |
| 2018/0312382 A1* | 11/2018 | Kim ....................... | G05D 1/024 |

FOREIGN PATENT DOCUMENTS

| | | |
|---|---|---|
| JP | 2015054730 A | 3/2015 |
| JP | 2017-151652 A | 8/2017 |
| JP | 2017-178567 A | 10/2017 |
| JP | 2018-058679 A | 4/2018 |

OTHER PUBLICATIONS

U.S. Appl. No. 16/517,972, filed Jul. 22, 2019, Inventors: Katsuhiko Nagasawa et al.

* cited by examiner

*Primary Examiner* — Thomas D Alunkal
(74) *Attorney, Agent, or Firm* — Sughrue Mion, PLLC

(57) ABSTRACT

Distance measurements are performed by a fork pocket detection sensor at a position at which the fork pocket detection sensor faces one of fork pockets and at a position at which the fork pocket detection sensor faces the central position in the horizontal direction between the fork pockets on a pallet side face, and information obtained by combining pieces of distance-measurement information acquired by the distance measurements is compared with information of predefined shapes of the fork pockets, so as to specify the positions of the fork pockets. Hereby, it is possible to accurately detect the positions of the fork pockets without causing a decrease of conveyance efficiency.

5 Claims, 15 Drawing Sheets

CONVEYING APPARATUS

INCORPORATION BY REFERENCE

The disclosure of Japanese Patent Application No. 2018-188827 filed on Oct. 4, 2018 including the specification, drawings and abstract is incorporated herein by reference in its entirety.

BACKGROUND

1. Technical Field

The disclosure relates to a conveying apparatus. More particularly, the disclosure relates to improvement of a technique to detect positions of fork pockets in a pallet on which packages are placed.

2. Description of Related Art

In the related art, a plurality of component boxes in which components are stored or component boxes (empty boxes) from which components are taken out is placed on a pallet and conveyed by a forklift in an automobile production factory or the like. In the following description, the form where a plurality of components boxes (hereinafter also referred to as packages) is placed on a pallet is referred to as a skid.

Such an operation is performed that a forklift is automatically operated to convey a skid. However, in this case, in order to automatically insert two blades (blades of a fork) provided in the forklift into two fork pockets provided on a pallet side face, respectively, it is necessary to accurately detect respective positions of the fork pockets.

Japanese Unexamined Patent Application Publication No. 2017-178567 (JP 2017-178567 A) describes a technology to detect a position of a fork pocket by use of a laser beam. More specifically, in a detection technique to detect a fork pocket as described in JP 2017-178567 A, a laser beam from a distance measurement sensor provided in a forklift is horizontally emitted for scanning, and distance data in the emission direction of the laser beam is acquired by detecting reflection light of the laser beam. Further, a process of performing coordinate conversion on the distance data, a process of specifying a position and a direction of a pallet based on an observation point group obtained by the coordinate conversion, and so on are performed. A straight line extending in the horizontal direction is extracted based on the observation point group, and clustering is performed on the straight line to select two clusters placed on the outer sides (corresponding to respective parts of a pallet side face on the outer sides in the horizontal direction from the fork pockets). Then, respective inner endpoints of the clusters are detected as positions of respective outer ends of the fork pockets.

SUMMARY

However, the detection technique to detect a fork pocket as disclosed in JP 2017-178567 A is to individually detect a position of each of two fork pockets provided on the pallet side face. In this case, after the whole pallet side face is recognized, respective positions of the fork pockets are detected individually.

However, in the technique in JP 2017-178567 A, the laser beam from the distance measurement sensor is horizontally emitted for scanning, and distance data is acquired by detecting reflection light of the laser beam. In this case, in the opposite end portions of the pallet side face in the horizontal direction, an emission angle of the laser beam to the pallet side face is large, and therefore, the reflection light of the laser beam easily varies widely. On this account, an output from the distance measurement sensor also easily varies widely, so that it is difficult to sufficiently raise detection accuracy in the opposite end portions. As a result, the reliability of recognition of the whole pallet side face might not be achieved sufficiently, so that the reliability of accurate detection of the positions of the fork pockets might not be achieved sufficiently. Particularly, the opposite end portions on the pallet side face in the horizontal direction might be damaged due to a hit by the blades of the forklift or a collision between pallets along with the use of the pallet over a long period. Accordingly, the detection technique in the related art that requires detection accuracy in the opposite end portions has its limits in terms of accurate detection of the positions of the fork pockets.

Further, when the emission angle of light (the laser beam or the like) to the pallet side face is reduced, the variation of the reflection light is reduced, so that it is possible to raise the reliability of accurate detection of the positions of the fork pockets. However, in that case, it is necessary to emit the light to the whole pallet side face from a direction generally perpendicular to the pallet side face by moving the distance measurement sensor from a position at which the distance measurement sensor faces a first end of the pallet side face in the horizontal direction to a position at which the distance measurement sensor faces a second end of the pallet side face. That is, in a case where the distance measurement sensor is provided in the forklift (particularly in a case where the distance measurement sensor is provided in a generally central part of the forklift in its moving direction), it is necessary to cause the forklift to move to a position at which the forklift faces the central part of the pallet side face (to cause the forklift to move in a reverse direction) after the positions of the fork pockets are detected by causing the forklift to move from a position at which the forklift faces the first end of the pallet side face in the horizontal direction to a position at which the forklift faces the second end of the pallet side face. This increases a moving distance of the forklift, thereby causing a decrease in skid conveyance efficiency.

The disclosure is accomplished in view of the above problems, and an object of the disclosure is to provide a conveying apparatus that can accurately detect positions of fork pockets without causing a decrease in conveyance efficiency.

In order to achieve the above object, the disclosure is to provide a conveying apparatus including a distance measurement sensor and a movement power source and configured to convey packages together with a pallet in such a manner that positions of right and left fork pockets provided in a pair on a side face of the pallet on which the packages are placed are detected based on an output from the distance measurement sensor, the conveying apparatus is moved by the movement power source to a position at which blades of a fork face the fork pockets, respectively, and the blades are inserted into the fork pocket, respectively. The conveying apparatus includes a first movement control portion, a fork pocket specifying portion, and a second movement control portion. The first movement control portion is configured to control the movement power source so that the conveying apparatus is placed at a first movement position at which the distance measurement sensor faces one of the fork pockets or the conveying apparatus is placed at a second movement position at which the distance measurement sensor faces a central position in a horizontal direction between the fork pockets on the side face of the pallet. The fork pocket specifying portion is configured to specify the positions of the fork pockets by comparing, with information of predefined shapes of the fork pockets, information formed by combining distance-measurement information acquired by a distance measurement performed on the pallet by the distance measurement sensor at the first movement position and distance-measurement information acquired by a distance measurement performed on the pallet by the distance measurement sensor at the second movement position. The second movement control portion is configured to control the movement power source so that the conveying apparatus moves to a position at which the blades respectively face the fork pockets the positions of which are specified by the fork pocket specifying portion.

With this particular matter, at the time when the positions of the fork pockets are detected and the blades of the fork are inserted into the fork pockets, the movement power source is controlled by the first movement control portion so that the conveying apparatus is moved to the first movement position at which the distance measurement sensor faces one of the fork pockets, and the distance measurement is performed on the pallet by the distance measurement sensor at the first movement position (a measurement of a distance to each part on a pallet side face; a measurement of a distance to recognize the fork pocket). Further, the movement power source is controlled by the first movement control portion, so that the conveying apparatus is moved to the second movement position at which the distance measurement sensor faces the central position in the horizontal direction between the fork pockets on the pallet side face, and the distance measurement is performed on the pallet by the distance measurement sensor at the second movement position. Then, the positions of the fork pockets are specified by the fork pocket specifying portion in such a manner that the information formed by combining the distance-measurement information acquired by the distance measurement performed on the pallet by the distance measurement sensor at the first movement position and the distance-measurement information acquired by the distance measurement performed on the pallet by the distance measurement sensor at the second movement position is compared with the information of the predefined shapes of the fork pockets. Then, the second movement control portion controls the movement power source so that the conveying apparatus moves to a position where the blades respectively face the fork pockets the positions of which are specified by the fork pocket specifying portion. Hereby, the blades face the fork pockets, respectively. When the blades are moved forward in this state, the blades are inserted into the fork pockets successfully.

Since the specification of the positions of the fork pockets and the insertion of the blades into the fork pockets are performed, the positions of the fork pockets can be specified only by performing a distance measurement at a position at which the distance measurement sensor faces one of the fork pockets and a distance measurement at a position at which the distance measurement sensor faces the central position in the horizontal direction between the fork pockets on the pallet side face as the distance measurement by the distance measurement sensor. That is, it is not necessary to individually detect the positions of the fork pockets after the whole pallet side face is recognized. As a result, it is possible to accurately detect the positions of the fork pockets without causing a decrease of conveyance efficiency.

Further, the distance measurement sensor may be configured to emit light for distance measurement toward the pallet through a region between the blades of the fork in a plan view. The first movement control portion may be configured to control the movement power source so that the conveying apparatus moves to the second movement position after the distance measurement is performed by the distance measurement sensor at the first movement position.

In this configuration, when the conveying apparatus moves to the second movement position, the positions of the fork pockets are specified after the distance measurement is performed in a state where the distance measurement sensor faces the central position in the horizontal direction between the fork pockets on the pallet side face. On this account, a moving distance of the conveying apparatus can be made short at the time when the conveying apparatus is to be moved to a position at which the blades face the fork pockets, respectively, after that. That is, it is possible to shorten time after the distance measurement is performed at the second movement position until the blades are inserted into the fork pockets, respectively, thereby making it possible to contribute to an improvement of conveyance efficiency.

Further, the fork pocket specifying portion may be configured to: form a pallet model having hole portions estimated as the fork pockets by combining the pieces of distance-measurement information; compare dimensions of the hole portions in the pallet model with a dimension range approximate to predefined dimensions of the fork pockets; and specify positions of the hole portions as the positions of the fork pockets with the proviso that the dimensions of the hole portions in the pallet model fall within the approximate dimension range.

With this configuration, it is possible to perform determination of the fork pockets based on the pallet model with high accuracy.

Further, a pallet placement lane on which a plurality of pallets is arranged may be adjacent to a conveying apparatus lane where the conveying apparatus moves along the pallet placement lane. When each of the distance measurements is to be performed on the pallet by the distance measurement sensor, the conveying apparatus may stop at a corresponding one of the first movement position and the second movement position on the conveying apparatus lane.

In a case where the pallet placement lane is adjacent to the conveying apparatus lane as such, an emission angle of light (light for distance measurement) from the distance measurement sensor to the pallet side face is large in the opposite ends of the pallet side face in the horizontal direction, and reflection light of the light easily varies widely. In the disclosure, as described above, the distance measurements are performed on the pallet by the distance measurement sensor at the first movement position and at the second movement position, and respective pieces of distance-measurement information acquired herein are combined so as to specify the positions of the fork pockets. Accordingly, even in a case where the pallet placement lane is adjacent to the conveying apparatus lane (even in a configuration where the emission angle easily becomes large), it is possible to accurately detect the positions of the fork pockets.

Further, the distance measurement sensor may be fixed at a height position predefined so that the distance measurement sensor faces the side face of the pallet.

With this configuration, the distance measurement sensor can face the pallet side face regardless of a raised-lowered position of the fork, thereby making it possible to cause the distance measurement sensor to successfully face the pallet side face at the first movement position and at the second movement position only by the control on the movement power source by the first movement control portion. This also makes it possible to achieve simplification of the control for the distance measurement at each part.

In the disclosure, distance measurements are performed by a distance measurement sensor at a position at which the distance measurement sensor faces one of fork pockets and at a position at which the distance measurement sensor faces the central position in the horizontal direction between the fork pockets on a pallet side face, and information obtained by combining pieces of distance-measurement information acquired by the distance measurements is compared with information of predefined shapes of the fork pockets, so as to specify positions of the fork pockets. On this account, it is not necessary to individually detect respective positions of the fork pockets after the whole pallet side face is recognized. As a result, it is possible to accurately detect the positions of the fork pockets without causing a decrease of conveyance efficiency.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

An embodiment of the disclosure is described below with reference to the drawings. The present embodiment deals with a case where the disclosure is applied to a conveying apparatus to be used to convey an empty-box skid to an empty-box skid chute from a conveyance wagon in an empty-box return station in an automobile production factory. The empty-box skid is configured such that a plurality of empty boxes (empty component boxes; packages in the disclosure) from which components have been taken out (components have been supplied to a product line) is placed on a pallet. Note that, in the following description, an operation of taking out the empty-box skid on the conveyance wagon by use of the conveying apparatus is referred to as an empty-box-skid receipt operation, and an operation of transferring (placing) the empty-box skid to the empty-box skid chute from the conveying apparatus is referred to as an empty-box-skid discharge operation.

Conveying Apparatus

Figure 1:
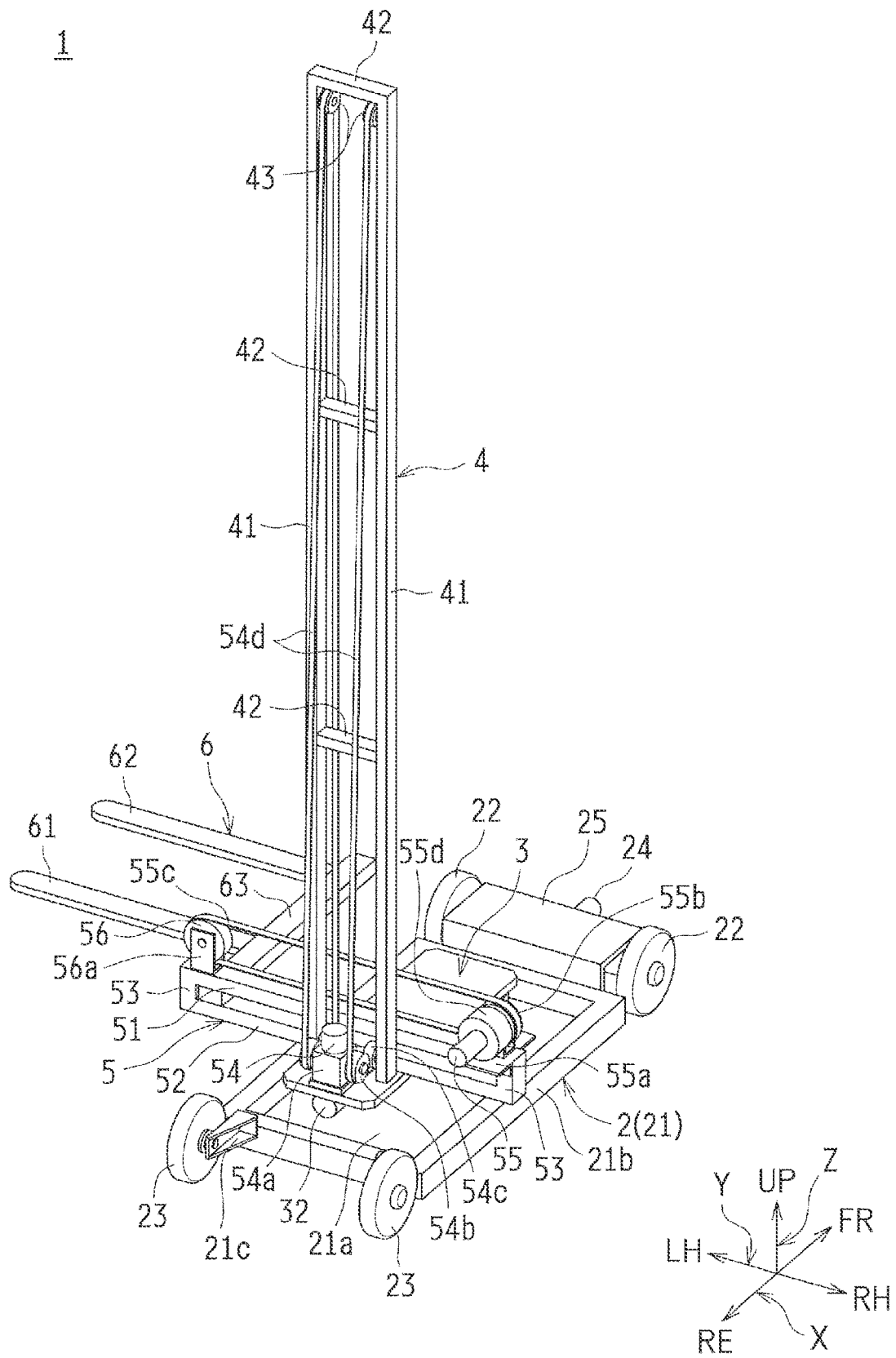
FIG. 1 is a perspective view of a conveying apparatus according to an embodiment.
Figure 2:
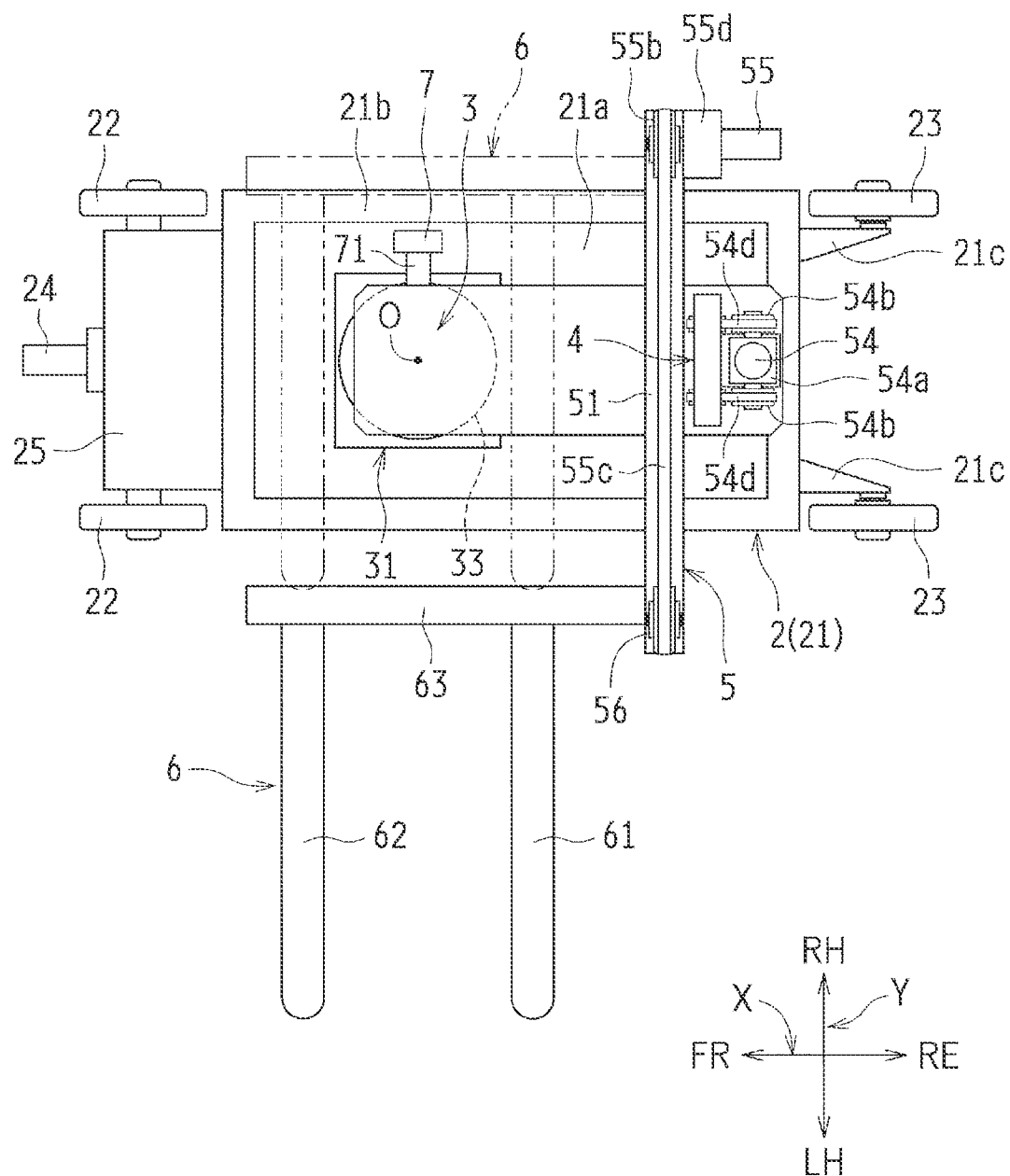
FIG. 2 is a plan view of the conveying apparatus according to the embodiment.

FIG. 1 is a perspective view of a conveying apparatus 1 according to the present embodiment. Further, FIG. 2 is a plan view of the conveying apparatus 1 according to the present embodiment. Herein, for convenience, the deep side in FIG. 1 and the left side in FIG. 2 are referred to as the front side of the conveying apparatus 1, and the near side in FIG. 1 and the right side in FIG. 2 are referred to as the rear side of the conveying apparatus 1. On this account, in these figures, an arrow FR indicates the front direction, an arrow RE indicates the rear direction, an arrow UP indicates the upper direction, an arrow RH indicates the right direction, and an arrow LH indicates the left direction. Further, in the following description, the front-rear direction of the conveying apparatus 1 may be also referred to as an X-axis direction, the width direction (the right-left direction) of the conveying apparatus 1 may be also referred to as a Y-axis direction, and the vertical direction may be also referred to as a Z-axis direction.

As illustrated in FIGS. 1 and 2, the conveying apparatus 1 includes a wagon 2, a swivel base 3, a support 4, a sliding mechanism 5, and a fork 6.

Wagon

The wagon 2 is a member configured to move the conveying apparatus 1 and to support the swivel base 3, the support 4, the sliding mechanism 5, and the fork 6. The wagon 2 includes a wagon body 21, four wheels 22, 23, and a drive motor (constituted by an electric motor) 24.

The wagon body 21 has a rectangular shape in a plan view and includes a base plate 21a and vertical walls 21b extending vertically upward from respective outer edges of the base plate 21a. A space in which a turning drive mechanism 31 (described later) configured to turn the swivel base 3 is stored is provided inside the vertical walls 21b.

A movement power source support bracket 25 extending forward in the horizontal direction is attached to a front end face of the wagon body 21. The drive motor 24 serving as a movement power source is supported on a bottom face of the movement power source support bracket 25. The drive motor 24 includes a drive shaft (output shaft) extending along the front-rear direction (the X-axis direction) of the conveying apparatus 1. Further, the wheels 22 serving as driving wheels are disposed on the right and left sides (both sides in the Y-axis direction) of the movement power source support bracket 25. The wheels 22 rotate by receiving a rotational power from the drive motor 24. More specifically, a power transmission mechanism (not shown) configured to transmit the rotational power from the drive motor 24 to the wheels 22 is attached to the movement power source support bracket 25. The power transmission mechanism includes a gear mechanism configured to convert a rotation direction of the rotational power output from the drive motor 24 (from a rotation around the X axis to a rotation around the Y axis), a speed reducer configured to decelerate a rotation speed, and so on.

The wheels 23 serving as follower wheels are supported rotatably around the horizontal axis (the Y axis) by brackets 21c attached to a rear end face of the wagon body 21.

Swivel Base

The swivel base 3 is constituted by a generally rectangular plate material smaller than the base plate 21a of the wagon body 21 and is provided on the top of the turning drive mechanism 31 disposed in a central part of the base plate 21a of the wagon body 21 so that the swivel base 3 can rotate (turn) around the vertical axis (the Z axis). A longitudinal dimension of the swivel base 3 (a dimension along the X-axis direction in a state illustrated in FIGS. 1 and 2; a turning position of the swivel base 3 illustrated in FIGS. 1 and 2 is referred to as a turning initial position of the swivel base 3) is set to be shorter than a longitudinal dimension of the wagon body 21 (a dimension in the X-axis direction) but longer than a width dimension of the wagon body 21 (a dimension in the Y-axis direction).

Further, a fork pocket detection sensor (a distance measurement sensor) 7 is attached to the swivel base 3 via a bracket 71. The fork pocket detection sensor 7 is a sensor configured to detect positions of fork pockets FP of a pallet P in an empty-box skid S (see FIG. 4) (described later) and is constituted by a laser sensor. Further, the fork pocket detection sensor 7 is disposed at a height position at which the fork pocket detection sensor 7 faces a side face of the pallet P in the empty-box skid S placed on a conveyance wagon CC (see FIG. 5) (described later) and is configured to emit a laser beam for distance measurement toward the pallet P through a part between blades 61, 62 of the fork 6 in a plan view (see FIG. 2). That is, in a state where the swivel base 3 is placed at the turning initial position, the fork pocket detection sensor 7 is configured to detect the positions of the fork pockets FP by emitting the laser beam along the width direction (the Y-axis direction) of the conveying apparatus 1 (the fork pocket detection sensor 7 emits the laser beam toward the pallet P through above the wagon body 21) and detecting reflection light from the side face (a pallet side face) of the pallet P in the empty-box skid S. More specifically, the fork pocket detection sensor 7 is a distance measurement sensor that employs a detection technique called a time-of-flight (TOF) method, for example. The TOF method is a method in which distance measurement light (the laser beam in the present embodiment) is emitted toward a subject (the pallet P in the present embodiment), and a distance to each part is calculated based on a time difference of reflection light of the distance measurement light. That is, after the distance measurement light constituted by a laser beam subjected to intensity modulation by a predetermined emission pattern is emitted toward the subject (the pallet P), the distance measurement light (reflection light) reflected back from the subject is received by an image sensor so as to detect a time difference from light emission to light reception for each pixel based on the emission pattern, thereby calculating a distance. A calculated distance value for each pixel is collected into a bit-map form, so that a distance image is generated. Details of a technique to detect the positions of the fork pockets FP based on an output signal from the fork pocket detection sensor 7 will be described later.

Note that an attachment position of the fork pocket detection sensor 7 is not limited to the swivel base 3, and the fork pocket detection sensor 7 may be provided on the wagon body 21.

The turning drive mechanism 31 includes a sprocket 33 supported by the base plate 21a so as to be rotatable around the vertical axis (the Z axis), and the swivel base 3 is attached to a top face of the sprocket 33 by means such as bolting in an integrally rotatable manner. Further, the turning drive mechanism 31 includes a turning motor 32. The turning motor 32 is disposed at a position closer to the rear side on the base plate 21a of the wagon body 21 and serves as a turning power source for the swivel base 3. The turning motor 32 includes a drive shaft (an output shaft) extending along the front-rear direction (the X-axis direction) of the conveying apparatus 1. The sprocket 33 rotates by receiving a rotational power from the turning motor 32. Along with this, the swivel base 3 rotates around the vertical axis (the Z axis). More specifically, a power transmission mechanism (not shown) configured to transmit the rotational power from the turning motor 32 to the sprocket 33 is provided between the turning motor 32 and the sprocket 33. The power transmission mechanism includes a gear mechanism configured to convert a rotation direction of the rotational power output from the turning motor 32 (from a rotation around the X axis to a rotation around the Z axis), a speed reducer configured to decelerate a rotation speed, and so on. A chain is provided over a sprocket (a driving sprocket) (not shown) connected to the speed reducer and the sprocket (a follower sprocket) 33, and the rotational power output from the turning motor 32 is transmitted to the follower sprocket 33 via the power transmission mechanism, so that the swivel base 3 can rotate around the vertical axis (the Z axis).

Further, a height position of the swivel base 3 is set such that a height position of a bottom face of the swivel base 3 is slightly higher than a height position of upper ends of the vertical walls 21b of the wagon body 21. That is, the turning drive mechanism 31 is disposed on the base plate 21a so that a height position of a top face of the sprocket 33 to which the swivel base 3 is attached is slightly higher than the height position of the upper ends of the vertical walls 21b of the wagon body 21. On this account, at the time when the swivel base 3 rotates around the vertical axis, the swivel base 3 does not interfere with the wagon body 21 (the vertical walls 21b of the wagon body 21). Note that, in order that a disposition height position of the swivel base 3 is set to be as low a position as possible, it is preferable that a distance between the height position of the bottom face of the swivel base 3 and the height position of the upper end of the vertical wall 21b of the wagon body 21 be small.

Support

The support 4 is provided in a standing manner at a position closer to the rear side on the swivel base 3 (a position closer to the rear side at the turning initial position of the swivel base 3 illustrated in FIG. 1) and extends in the vertical direction. More specifically, the support 4 is provided in a standing manner at a position closer to the rear side (at a position offset to the rear side) than a turning center (a rotation center of the follower sprocket 33) 0 of the swivel base 3 to be turned by the turning drive mechanism 31. The support 4 includes a pair of right and left columnar members 41 extending in the vertical direction, and a plurality of joint members 42 provided such that the joint members 42 are disposed at positions distanced from each other at predetermined intervals in the vertical direction so as to connect the columnar members 41 to each other.

A height dimension of the support 4 is set such that, in a case where empty-box skids S are to be stacked by the conveying apparatus 1 (for example, in a case where the empty-box skids S are stacked in several stages on an empty-box skid conveyer SC of an empty-box skid chute SS (described later) (see FIG. 5)), an upper end position of the support 4 is about the same as a stacking height position, in the vertical direction, of the empty-box skid S placed at the uppermost position.

Sliding Mechanism and Fork

The sliding mechanism 5 is movable up and down along the extending direction of the support 4 and horizontally slides the fork 6 between an advance position (a position indicated by a continuous line in FIG. 2) at which the empty-box skid S is transferred (receipt and discharge) and a retreat position (a position indicated by a virtual line in FIG. 2) at which the empty-box skid S is placed on the swivel base 3 in a state where the empty-box skid S is held by the fork 6.

More specifically, the sliding mechanism 5 includes guide members 51, 52 configured to guide the slide movement of the fork 6. The guide members are provided such that the upper guide member 51 and the lower guide member 52 are disposed in parallel to each other (in parallel along the Y-axis direction) at a predetermined interval in the vertical direction. The opposite ends of the upper guide member 51 in the longitudinal direction are respectively connected to the opposite ends of the lower guide member 52 in the longitudinal direction via joint members 53. On this account, the upper guide member 51 is distanced from the lower guide member 52 at the predetermined interval in the vertical direction just by the height dimension of the joint members 53. Further, the guide members 51, 52 extend over a first side of the support 4 to a second side of the support 4 in the horizontal direction (the Y-axis direction). That is, first sides of the guide members 51, 52 in the longitudinal direction (the Y-axis direction) extend toward the left direction (the left direction in FIG. 1) only by a predetermined dimension, and their distal end positions are placed further on the left side from a left edge of the wagon 2 in a plan view. Similarly, second sides of the guide members 51, 52 in the longitudinal direction (the Y-axis direction) extend toward the right direction (the right direction in FIG. 1) only by a predetermined dimension, and their distal end positions are placed further on the right side from a right edge of the wagon 2 in a plan view.

The fork 6 includes a pair of blades 61, 62 extending along the Y-axis direction and a connecting portion 63 extending in the front-rear direction (the X-axis direction) so as to connect respective base ends of the blades 61, 62. A rear end portion of the connecting portion 63 is engaged with the upper guide member 51 and the lower guide member 52, so that the fork 6 is slidable in the horizontal direction.

A raising-lowering motor 54 is disposed on the swivel base 3, in the vicinity of a bottom end of the support 4. The raising-lowering motor 54 includes a drive shaft (an output shaft) extending along the vertical direction (the Z-axis direction). Further, the drive shaft of the raising-lowering motor 54 is connected to a power transmission mechanism 54a provided on the swivel base 3. The power transmission mechanism 54a includes a gear mechanism configured to convert a rotation direction of a rotational power output from the raising-lowering motor 54 (from a rotation around the Z axis to a rotation around the Y axis), a speed reducer configured to decelerate a rotation speed, and so on. Output shafts (not shown) of the power transmission mechanism 54a extend toward the opposite sides in the Y-axis direction, and pulleys 54b are attached to the output shafts. In the meantime, a bottom end and an upper end of each columnar member 41 in the support 4 are provided with pulleys 54c, 43 rotatable around the width direction (the Y-axis direction) of the conveying apparatus 1. A belt 54d is wound around the pulleys 54b, 54c, 43. On this account, when the pulleys 54b attached to the output shafts of the power transmission mechanism 54a rotate along with the operation of the raising-lowering motor 54, the belts 54d are moved around the pulleys 54b, 54c, 43 by rotational forces from the pulleys 54b. The guide members 51, 52 of the sliding mechanism 5 are connected to the belts 54d within a span between the pulleys 54c, 43, so that the sliding mechanism 5 is configured to move up and down along the extending direction of the support 4 along with the movement of the belts 54d. That is, by adjusting a rotational amount of the raising-lowering motor 54, it is possible to control a raised-lowered position of the sliding mechanism 5. As described earlier, the fork 6 is engaged with the upper guide member 51 and the lower guide member 52, and therefore, the fork 6 also moves up and down along with the up-and-down movement of the sliding mechanism 5, thereby making it possible to control a raised-lowered position of the fork 6 by controlling the raised-lowered position of the sliding mechanism 5.

A slide motor 55 is supported by a right edge of a top face of the upper guide member 51 via a bracket 55a. The slide motor 55 includes a drive shaft (output shaft) extending along the front-rear direction (the X-axis direction) when the swivel base 3 is placed at the turning initial position. Further, a speed reducer 55d is connected to the drive shaft of the slide motor 55. Further, a pulley 55b is attached to an output shaft of the speed reducer 55d. In the meantime, a pulley 56 rotatable around the front-rear direction (the X-axis direction) when the swivel base 3 is placed at the turning initial position is supported, via a bracket 56a, by a left edge on the top face of the upper guide member 51. A belt 55c is wound around the pulley (a driving pulley) 55b connected to the slide motor 55 and the pulley (a follower pulley) 56 supported by the left edge of the top face of the upper guide member 51. On this account, when the driving pulley 55b rotates along with the operation of the slide motor 55, the belt 55c moves between the driving pulley 55b and the follower pulley 56 due to a rotational force from the driving pulley 55b. The connecting portion 63 of the fork 6 is connected to the belt 55c so that the fork 6 slides along the extending direction (the horizontal direction) of the guide members 51, 52 along with the movement of the belt 55c. That is, by adjusting a rotational amount of the slide motor 55, it is possible to control a slide position of the fork 6. Hereby, the fork 6 is slidable in the horizontal direction between the advance position (the position indicated by a continuous line in FIG. 2) at which the empty-box skid S is transferred (receipt and discharge) and the retreat position (the position indicated by a virtual line in FIG. 2) at which the empty-box skid S is placed on the swivel base 3 in a state where the empty-box skid S is held by the fork 6. Further, in a state where the fork 6 is placed at the retreat position, the blades 61, 62 of the fork 6 are placed on the opposite sides (the opposite sides in a direction along the X-axis direction) of the turning center O of the swivel base 3 in a plan view, and hereby, at the retreat position, the empty-box skid S held by the fork 6 is placed above the turning center O of the swivel base 3. That is, the empty-box skid S is held by the fork 6 in a state where the gravitational center position of the empty-box skid S is made closer to the turning center O of the swivel base 3.

Control Block

Figure 3:
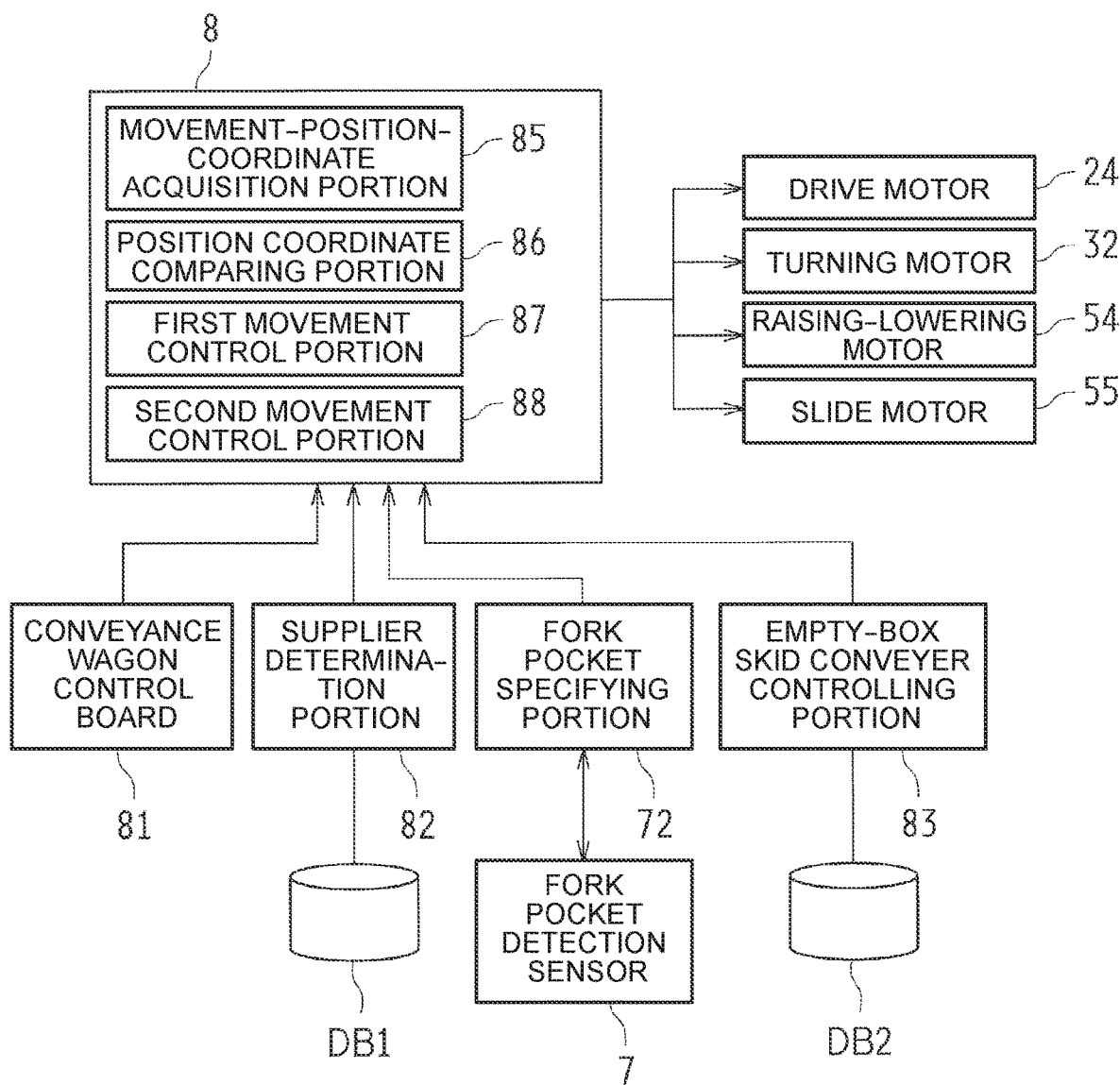
FIG. 3 is a block diagram illustrating a configuration of a control system of the conveying apparatus according to the embodiment.

FIG. 3 is a block diagram illustrating the configuration of a control system of the conveying apparatus 1 according to the present embodiment. The control system of the conveying apparatus 1 includes a control board 8 as illustrated in FIG. 3. Although not illustrated herein, the control board 8 includes a central processing unit (CPU), a read only memory (ROM), a random access memory (RAM), and so on that are publicly known.

In the ROM, a control program or the like for controlling the conveying apparatus 1 that conveys the empty-box skid S is stored. The CPU executes a computing process based on the control program stored in the ROM. The RAM is a memory in which a computing result or the like by the CPU is temporarily stored.

A fork pocket specifying portion 72, a conveyance wagon control board 81, a supplier determination portion 82, and an empty-box skid conveyer controlling portion 83 are connected to the control board 8 so that the control board 8 receives information from them.

The fork pocket specifying portion 72 is connected to the fork pocket detection sensor 7 and receives an output from the fork pocket detection sensor 7. The fork pocket specifying portion 72 performs a fork pocket specifying process (described later) based on the output from the fork pocket detection sensor 7. Then, when positional information of the fork pockets FP found by the fork pocket specifying process is output to the control board 8, the control board 8 recognizes the positions of the fork pockets FP of the pallet P.

Figure 5:
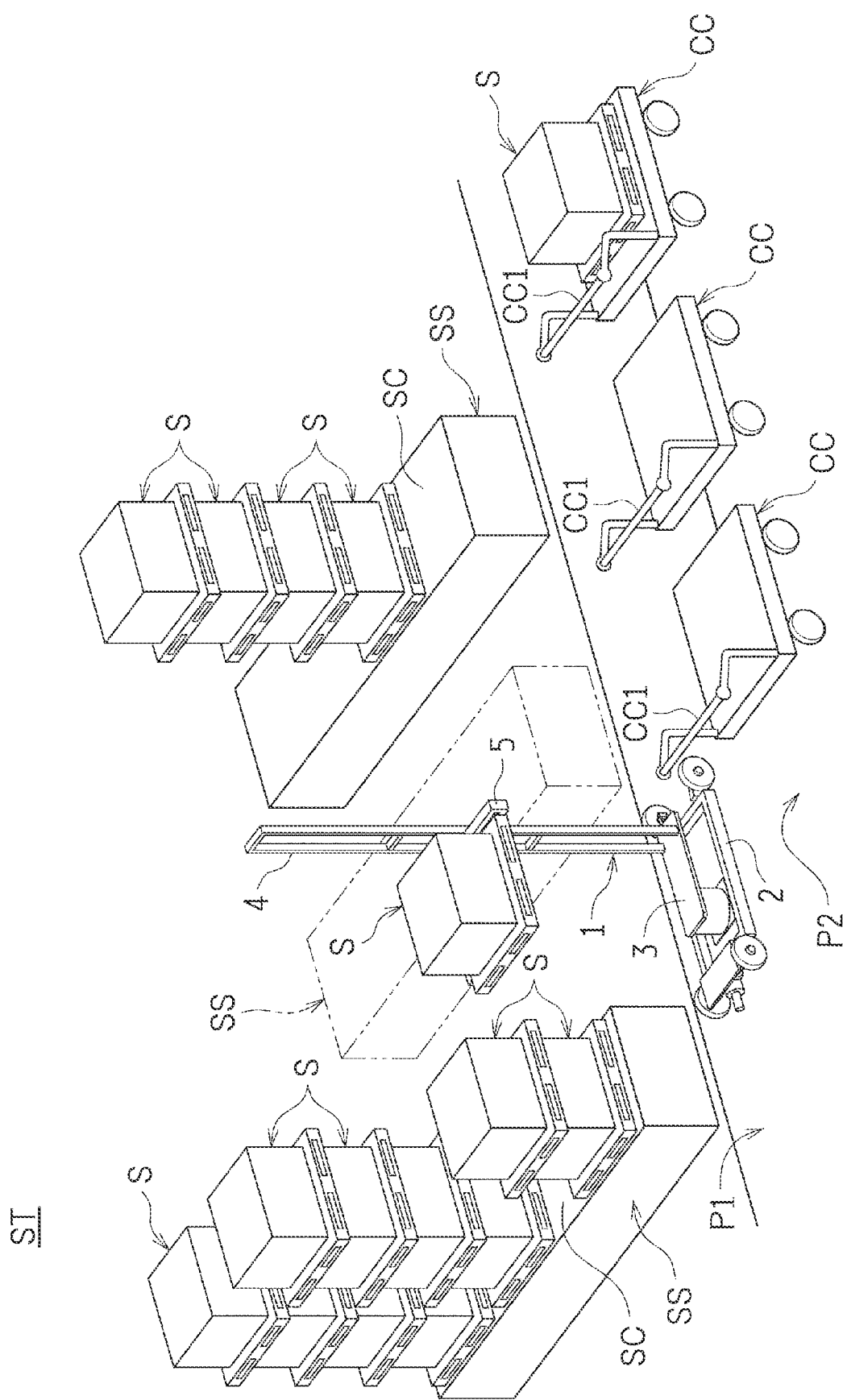
FIG. 5 is a view illustrating an empty-box return station in an automobile production factory.

The conveyance wagon control board 81 controls movement and stop of the conveyance wagon CC when the conveyance wagon CC (see FIG. 5 illustrating the empty-box return station ST in the automobile production factory) on which the empty-box skid S is placed is moved toward the empty-box return station ST. More specifically, the conveyance wagon CC is pulled by a tow car (not shown) so as to move to the empty-box return station ST. The control of movement and stop of the conveyance wagon CC by pulling by the tow car is well known, so that a description herein is omitted. When the control board 8 receives an output signal from the conveyance wagon control board 81, the control board 8 recognizes a stop position of the conveyance wagon CC. More specifically, in the present embodiment, as illustrated in FIG. 5, a plurality of conveyance wagons CC is connected and moved to the empty-box return station ST. Accordingly, the output signal from the conveyance wagon control board 81 includes pieces of information of respective stop positions of the conveyance wagons CC.

The supplier determination portion 82 acquires information of a returning destination of the empty-box skid S placed on the conveyance wagon CC, that is, a supplier of components (components supplied to a product line) accommodated in component boxes B in the empty-box skid S. For example, the supplier determination portion 82 determines the supplier by recognizing a label or the like (image recognition by image capture) displayed on or attached to a side face of the pallet P or side faces of the component boxes B in the empty-box skid S. Further, a database DB1 in which information of suppliers are associated with respective empty-box skid chutes SS provided in the empty-box return station ST is stored is connected to the supplier determination portion 82, and the supplier determination portion 82 specifies the empty-box skid chute SS from the information of the suppliers by referring to the information stored in the database DB1 and sends the information to the control board 8. When the control board 8 receives the output signal from the supplier determination portion 82, the control board 8 grasps individual returning destinations (the empty-box skid chutes SS as the returning destinations) of the empty-box skids S placed on respective conveyance wagons CC. Note that the supplier determination portion 82 may be provided in the empty-box return station ST or may be configured to acquire information of respective returning destinations of the empty-box skids S at a stage before the conveyance wagons CC are moved to the empty-box return station ST.

The empty-box skid conveyer controlling portion 83 controls the empty-box skid conveyer SC in the empty-box skid chute SS provided in the empty-box return station ST. As the control, more specifically, in a case where the upper limit of the number of stackable stages of the empty-box skids S on the empty-box skid conveyer SC is four, the empty-box skid conveyer SC is operated at the time when the empty-box skids S are stacked in four stages on the empty-box skid conveyer SC, so that the empty-box skids S stacked in the four stages are conveyed to a discharge side (for example, a side where a transport truck stands by). Further, a database DB2 in which setting information on the upper limit of the number of stackable stages of the empty-box skids S on the empty-box skid conveyer SC is stored is connected to the empty-box skid conveyer controlling portion 83. By referring to the information stored in the database DB2, the empty-box skid conveyer controlling portion 83 transmits, to the control board 8, the setting information on the upper limit of the number of stackable stages of the empty-box skids S on the empty-box skid conveyer SC. When the control board 8 receives the output signal from the empty-box skid conveyer controlling portion 83, the control board 8 grasps the number of current stages of the empty-box skids S placed on the empty-box skid conveyer SC and the upper limit of the number of stackable stages of the empty-box skids S on the empty-box skid conveyer SC. Hereby, the control board 8 controls a stacking height at the time when the empty-box skids S are placed on the empty-box skid conveyer SC (a stacking height, of the empty-box skid S, determined by moving the sliding mechanism 5 up and down).

Further, the drive motor 24, the turning motor 32, the raising-lowering motor 54, and the slide motor 55 are connected to the control board 8, and the control board 8 controls a moving operation of the conveying apparatus 1, a turning operation of the swivel base 3, a raising-lowering operation of the sliding mechanism 5, and a sliding operation of the fork 6 by outputting control signals to the motors 24, 32, 54, 55.

Empty-Box Skid

Figure 4:
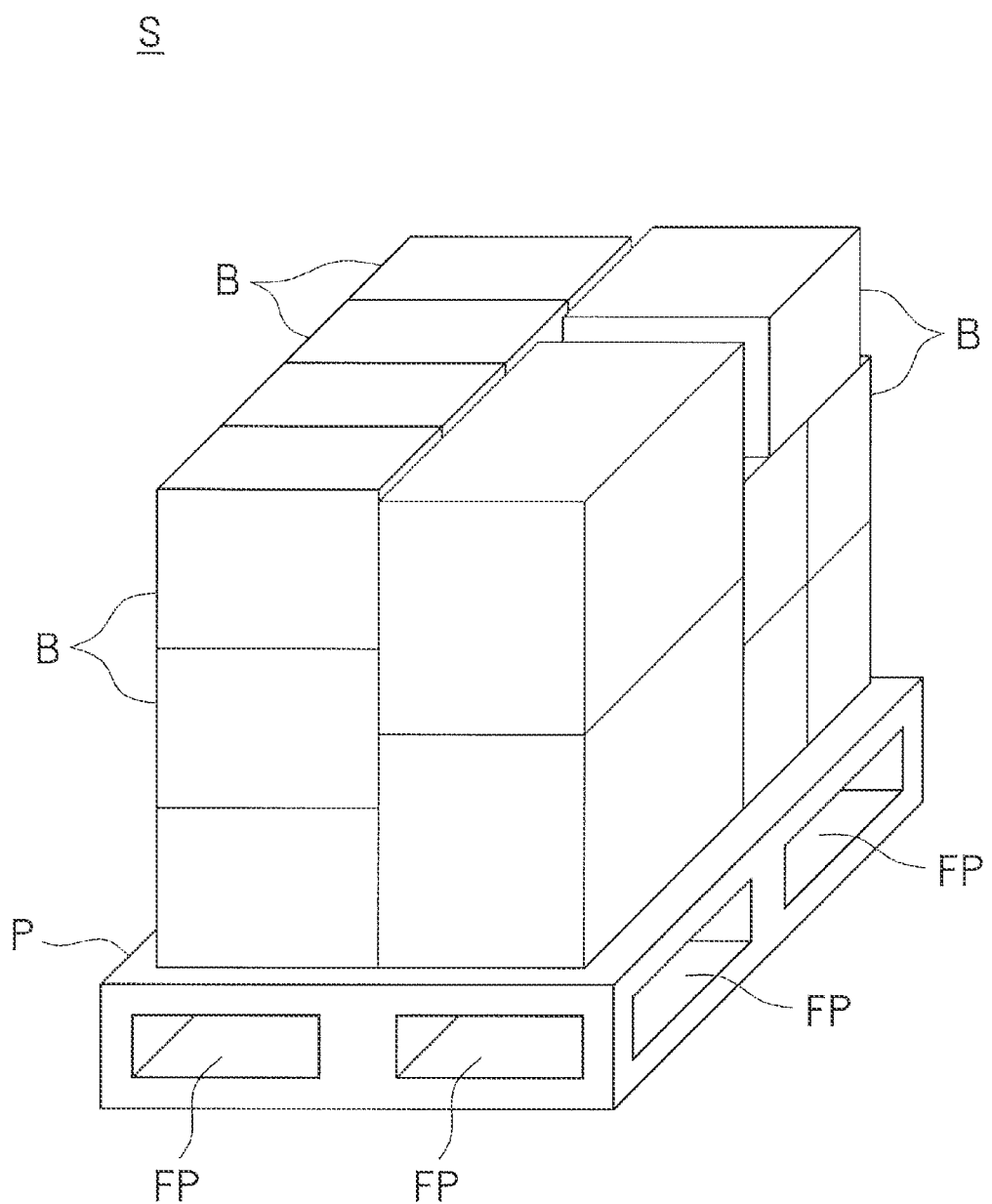
FIG. 4 is a view illustrating one example of an empty-box skid.

FIG. 4 is a view illustrating an example of the empty-box skid S to be conveyed by the conveying apparatus 1. As illustrated in FIG. 4, the empty-box skid S is configured such that a plurality of empty boxes (empty component boxes) B is placed on the pallet P. In the present embodiment, a pair of right and left fork pockets FP is provided on a side face of the pallet P. When the blades 61, 62 of the fork 6 are inserted into the fork pockets FP, the conveying apparatus 1 can lift up (hold) the empty-box skid S and convey the empty-box skid S.

Further, although not illustrated herein, information of a component manufacturer as a supplier of components accommodated in the empty boxes B is displayed on the side face of the pallet P. For example, the name of the component manufacturer, a two-dimensional code to identify the component manufacturer, or the like is displayed. By reading the display by the supplier determination portion 82, the supplier is determined.

Empty-Box Return Station

Next will be described the empty-box return station ST in which the conveying apparatus 1 configured as described above is used. As described above, the conveying apparatus 1 is used to convey the empty-box skid S from the conveyance wagon CC to the empty-box skid chute SS in the empty-box return station ST.

As illustrated in FIG. 5, in the empty-box return station ST, a plurality of empty-box skid chutes SS set for respective component manufacturers is provided (in FIG. 5, some empty-box skid chutes SS are indicated by a virtual line). Each empty-box skid chute SS includes an empty-box skid conveyer SC configured to convey the empty-box skids S. In the empty-box return station ST, along the arrangement direction of the empty-box skid chutes SS, a conveying apparatus passage (a conveying apparatus lane in the disclosure) P1 is provided on a side closer to the empty-box skid chutes SS, and a conveyance wagon passage (a pallet placement lane in the disclosure) P2 is provided on a side farther from the empty-box skid chutes SS so as to be adjacent to the conveying apparatus passage P1. That is, the conveying apparatus 1 moves on the conveying apparatus passage P1 relative to the conveyance wagons CC moving on the conveyance wagon passage P2, receives an empty-box skid S from a predetermined conveyance wagon CC, and transfers (places) the empty-box skid S thus received onto the empty-box skid conveyer SC of a predetermined empty-box skid chute SS.

Note that, as described above, in the empty-box return station ST in the present embodiment, the conveyance wagons CC connected to each other are pulled by a tow car (not shown) so as to be moved to the empty-box return station ST. Further, the conveyance wagon CC is provided with a handle CC1 so that an operator can move the conveyance wagon CC.

Fork Pocket Specifying Process

Next will be described the fork pocket specifying process that is a feature of the present embodiment. The fork pocket specifying process is to detect (specify) the positions of the fork pockets FP based on the output from the fork pocket detection sensor 7.

The following describes the outline of the fork pocket specifying process. In the fork pocket specifying process, two distance measurements are performed by the fork pocket detection sensor 7.

Figure 7A:
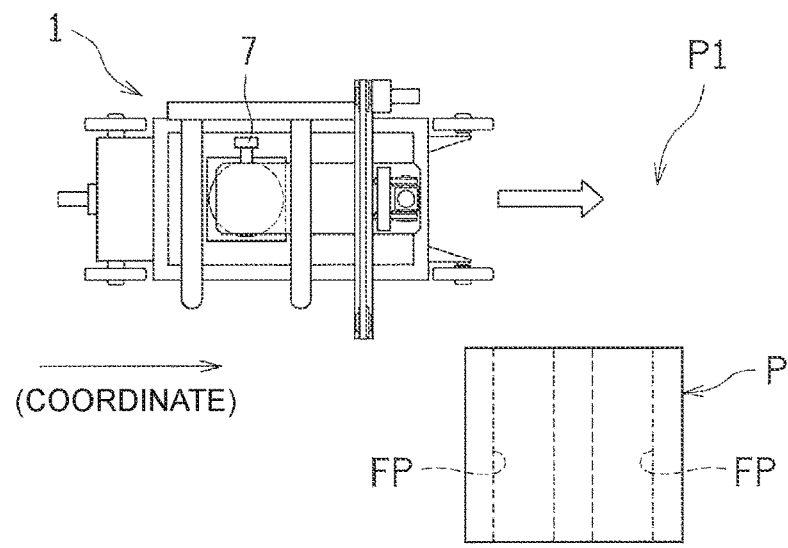
FIG. 7A is a plan view to describe a movement position of the conveying apparatus in the fork pocket specifying process.
Figure 7B:
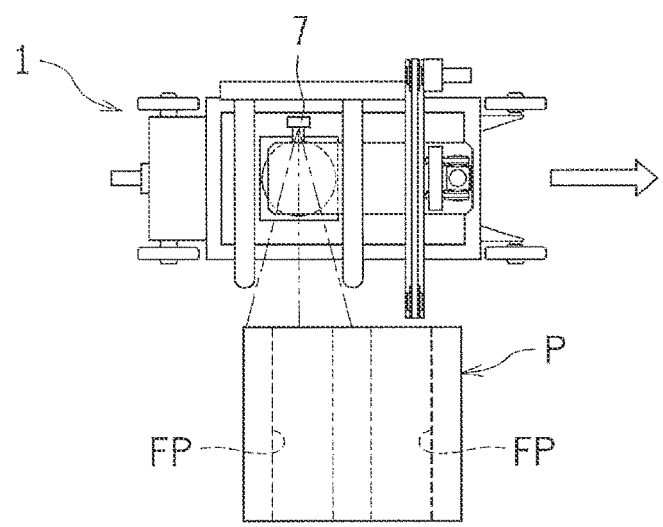
FIG. 7B is a plan view to describe a movement position of the conveying apparatus in the fork pocket specifying process.
Figure 7C:
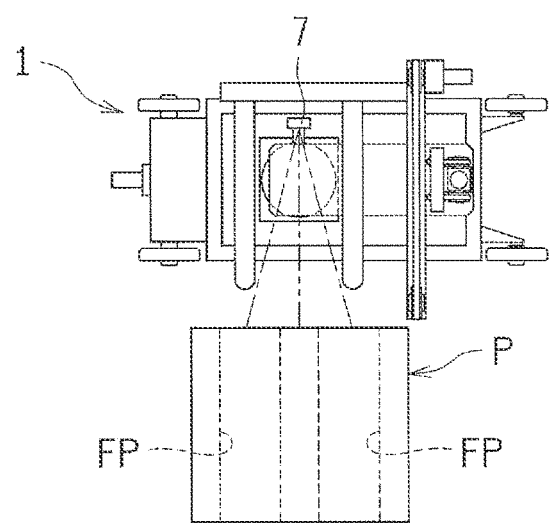
FIG. 7C is a plan view to describe a movement position of the conveying apparatus in the fork pocket specifying process.

One of the two distance measurements is a distance measurement in which the conveying apparatus 1 is moved to a position (hereinafter referred to as a first movement position) at which the fork pocket detection sensor 7 faces one of the fork pockets FP (the state where the conveying apparatus 1 stops at the first movement position is illustrated in FIG. 7B), and a distance to the pallet P is detected by the fork pocket detection sensor 7 placed at the first movement position. The other one of the two distance measurements is a distance measurement in which the conveying apparatus 1 is moved to a position (hereinafter referred to as a second movement position) at which the fork pocket detection sensor 7 faces a central position between the fork pockets FP in the horizontal direction on the pallet side face (the state where the conveying apparatus 1 stops at the second movement position is illustrated in FIG. 7C), and a distance to the pallet P is detected by the fork pocket detection sensor 7 placed at the second movement position. In order to stop the movement of the conveying apparatus 1 at the first movement position or the second movement position, the control board 8 transmits a control signal to the drive motor 24.

Then, a synthetic image (a synthetic image of a distance image) is formed by combining measurement results (pieces of distance-measurement information) acquired by the distance measurements, and information of the synthetic image is compared with information of predefined shapes of the fork pockets FP so as to specify the positions of the fork pockets FP. More specifically, an image (a synthetic image) of a part of the pallet P is formed by combining the pieces of distance-measurement information acquired by the distance measurements. As described above, the fork pocket detection sensor 7 is configured to detect the positions of the fork pockets FP by the TOF method. On this account, in a part (a pixel on the image) where it takes a relatively short time from emission of the laser beam to reflection, a distance to an object is short, and therefore, it is estimated that this part is the side face of the pallet P. In the meantime, in a part where it takes a relatively long time from emission of the laser beam to reflection or a part (a pixel on the image) without reflection light, the distance to the object is long, and therefore, it is estimated that this part is the fork pocket FP of the pallet P. That is, a recessed portion on this image (the part where it takes a relatively long time from emission of the laser beam to reflection or the part without reflection light) is estimated as the fork pocket FP. Then, it is determined whether or not a dimension of the part estimated as the fork pocket FP based on the image (a longitudinal dimension, a lateral dimension, and the like of the recessed portion) falls within a predetermined range of a predefined dimension of the fork pocket FP (a dimension range approximate to the dimension of the fork pocket FP), and when the dimension of the part estimated as the fork pocket FP falls within the predetermined range, it is determined that the recessed portion is the fork pocket FP. More specifically, relative positions of the fork pockets FP on the side face of the pallet P are predefined, and therefore, when the position of one of the fork pockets FP is estimated, it is also possible to estimate the position of the other one of the fork pockets FP. Hereby, a pallet model is formed, and by comparing a dimension of each part in the pallet model with the predetermined range of the dimension, the positions of the fork pockets FP are specified.

In order to perform such a fork pocket specifying process, the control board 8 is provided with a movement-position-coordinate acquisition portion 85, a position coordinate comparing portion 86, a first movement control portion 87, and a second movement control portion 88. Further, the fork pocket specifying portion 72 is connected to the control board 8.

The movement-position-coordinate acquisition portion 85 acquires a coordinate point of a movement position of the conveying apparatus 1 in the conveying apparatus passage P1. More specifically, as illustrated in FIG. 7A, a virtual coordinate along the extending direction of the conveying apparatus passage P1 is set, and a position (movement position) of the conveying apparatus 1 on this coordinate is acquired as a coordinate point on the coordinate. For example, an initial position of the conveying apparatus 1 is taken as an origin, and a moving distance from the initial position is calculated as a distance from the origin (a moving distance from the origin of the conveying apparatus 1) by detection or the like of a rotation angle of the drive motor 24.

The position coordinate comparing portion 86 compares the movement position of the conveying apparatus 1, acquired by the movement-position-coordinate acquisition portion 85, with a position of a target pallet (a pallet to be taken out by this conveyance operation) P. That is, the coordinate point, on the coordinate, that is the movement position of the conveying apparatus 1 is compared with the position (the coordinate point) of the pallet P on the coordinate, so that a current relative position of the conveying apparatus 1 with respect to the pallet P is found.

Note that the coordinate point of the movement position of the conveying apparatus 1 is, for example, a position (a coordinate point) of the fork pocket detection sensor 7. Further, the coordinate point of the pallet P is, for example, a position (a coordinate point) of an upstream end of the pallet P in the moving direction of the conveying apparatus 1 (the right direction in FIGS. 7A, 7B, 7C).

The first movement control portion 87 controls the drive motor 24 so that the conveying apparatus 1 stops at the first movement position and the second movement position. That is, a coordinate point on the coordinate is predefined for each of the first movement position and the second movement position (the position of the pallet P is specified based on a stop position, of the conveyance wagon CC, that is recognized based on an output signal from the conveyance wagon control board 81, and hereby, a coordinate point on the coordinate is predefined for each of the first movement position and the second movement position), and the first movement control portion 87 controls the rotation angle of the drive motor 24 so that the conveying apparatus 1 stops at those coordinate points.

The fork pocket specifying portion 72 performs a process of specifying the positions of the fork pockets FP. That is, the fork pocket specifying portion 72 forms a synthetic image by combining distance-measurement information acquired by the distance measurement at the first movement position and distance-measurement information acquired by the distance measurement at the second movement position, and compares a pallet model formed based on information of the synthetic image with information of the predefined shapes of the fork pockets FP, so as to specify the positions of the fork pockets FP.

The second movement control portion 88 controls the drive motor 24 so that the conveying apparatus 1 moves to a position at which the blades 61, 62 of the fork 6 respectively face the fork pockets FP the positions of which are specified by the fork pocket specifying portion 72. That is, as the positions of the fork pockets FP are specified, a coordinate point, on the coordinate, that corresponds to a position at which the blades 61, 62 of the fork 6 face the fork pockets FP is calculated, and the drive motor 24 is controlled so that the conveying apparatus 1 stops at the coordinate point.

Empty-Box Skid Conveyance Operation

The following describes the conveyance operation of the empty-box skid S in the empty-box return station ST, that is, an operation in which the conveying apparatus 1 receives the empty-box skid S from the conveyance wagon CC and transfers (places) the empty-box skid S onto a predetermined empty-box skid chute SS.

In the conveyance operation of the empty-box skid S, the empty-box-skid receipt operation of taking out the empty-box skid S on the conveyance wagon CC by use of the conveying apparatus 1, the moving operation of the conveying apparatus 1, and the empty-box-skid discharge operation of transferring (placing) the empty-box skid S to the empty-box skid chute SS from the conveying apparatus 1 are performed sequentially. The following sequentially describes each of the operations.

Empty-Box-Skid Receipt Operation

In the empty-box-skid receipt operation, first, individual returning destinations of the empty-box skids S placed on respective conveyance wagons CC moved to the empty-box return station ST by pulling by a tow car, that is, respective empty-box skid chutes SS to which the empty-box skids S are to be discharged are determined by the supplier determination portion 82 (suppliers of components are determined). That is, the supplier determination portion 82 determines a supplier by recognizing a label or the like displayed on or attached to a side face of the pallet P or side faces of the component boxes B in the empty-box skid S, refers to information stored in the database DB1 so as to acquire information in which information of the supplier thus determined is associated with the empty-box skid chute SS, and sends the information to the control board 8 of the conveying apparatus 1. Hereby, the control board 8 grasps individual returning destinations (the empty-box skid chutes SS as the returning destinations) of the empty-box skids S placed on respective conveyance wagons CC.

Then, the wheels 22 rotate along with the operation of the drive motor 24, so that the conveying apparatus 1 moves to a position at which the conveying apparatus 1 faces the conveyance wagon CC on which the empty-box skid S to be conveyed is placed. For example, the conveying apparatus 1 moves to a position at which the conveying apparatus 1 faces the second conveyance wagon CC from the near side in FIG. 5.

A feature of the empty-box-skid receipt operation in the present embodiment is that the fork pocket specifying process is performed at the time when the conveying apparatus 1 is to be moved to the position at which the conveying apparatus 1 faces the conveyance wagon CC on which the empty-box skid S to be conveyed is placed.

Figure 6:
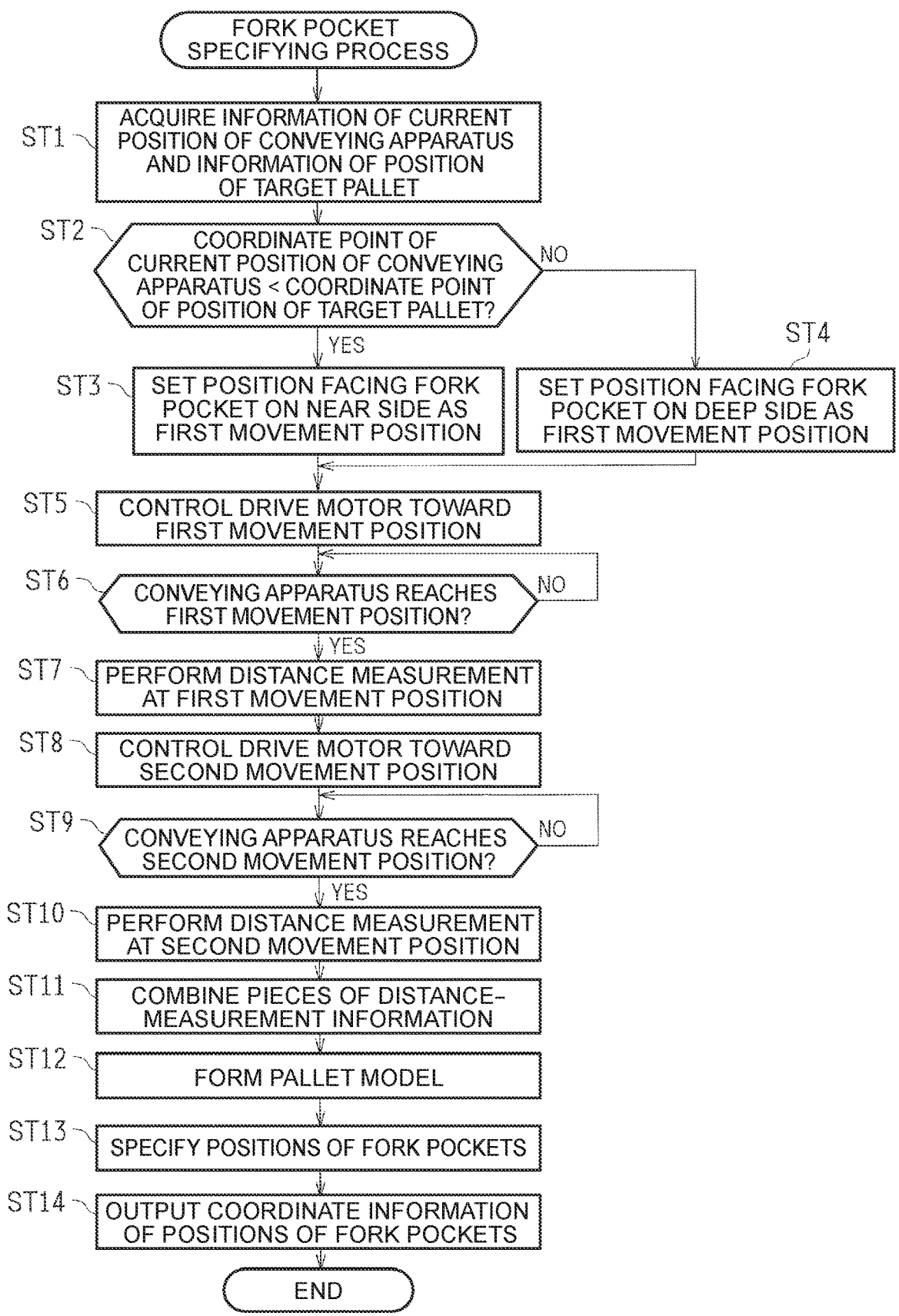
FIG. 6 is a flowchart to describe the procedure of a fork pocket specifying process.

The following describes the specific procedure of the fork pocket specifying process along the flowchart of FIG. 6.

First, in step ST1, information of a current position of the conveying apparatus 1 and information of a position of the target pallet (the pallet on which the empty-box skid S to be conveyed is placed) P are acquired. More specifically, information of the current position (a coordinate point) of the conveying apparatus 1 on the coordinate and information of the position (a coordinate point) of the target pallet P are acquired. As illustrated in FIG. 7A, in a case where the current position of the conveying apparatus 1 is placed on the upstream side in the moving direction (on the upstream side in the moving direction of the conveying apparatus 1; the left side in FIG. 7A) relative to the position of the target pallet P, the coordinate point of the current position of the conveying apparatus 1 is smaller than the coordinate point of the position of the target pallet P. Conversely, in a case where the current position of the conveying apparatus 1 is placed on the downstream side in the moving direction (on the downstream side in the moving direction of the conveying apparatus 1; the right side in FIG. 7A) relative to the position of the target pallet P, the coordinate point of the current position of the conveying apparatus 1 is larger than the coordinate point of the position of the target pallet P.

In step ST2, the coordinate point of the current position of the conveying apparatus 1 is compared with the coordinate point of the position of the target pallet P so as to determine whether the coordinate point of the current position of the conveying apparatus 1 is smaller than the coordinate point of the position of the target pallet P or not. That is, as illustrated in FIG. 7A, it is determined whether the current position of the conveying apparatus 1 is placed on the upstream side in the moving direction relative to the position of the target pallet P or not.

When the current position of the conveying apparatus 1 is placed on the upstream side in the moving direction relative to the position of the target pallet P and a YES-determination is made in step ST2, the process advances to step ST3, and a position at which the fork pocket detection sensor 7 faces the fork pocket FP placed on the near side (the left side in FIG. 7A) in the moving direction of the conveying apparatus 1 is set as the first movement position.

In the meantime, when the current position of the conveying apparatus 1 is placed on the downstream side in the moving direction relative to the position of the target pallet P (for example, the position of the fork pocket detection sensor 7 is placed on the right side from the fork pocket FP placed on the right side in the figure) and a NO-determination is made in step ST2, the process advances to step ST4, and a position at which the fork pocket detection sensor 7 faces the fork pocket FP placed on the deep side (the right side in FIG. 7A) in the moving direction of the conveying apparatus 1 is set as the first movement position.

After the first movement position is set as such, the process advances to step ST5, and the drive motor 24 is controlled so that the conveying apparatus 1 moves to the first movement position (the conveying apparatus 1 stops at the first movement position). More specifically, in step ST3, when the position at which the fork pocket detection sensor 7 faces the fork pocket FP placed on the near side is set as the first movement position, the drive motor 24 is controlled so that the conveying apparatus 1 moves forward (moves to the right direction in FIG. 7A). In the meantime, in step ST4, when the position at which the fork pocket detection sensor 7 faces the fork pocket FP placed on the deep side is set as the first movement position, the drive motor 24 is controlled so that the conveying apparatus 1 moves rearward (moves to the left direction in FIG. 7A).

In step ST6, it is determined whether the conveying apparatus 1 has reached the first movement position or not. When the conveying apparatus 1 has reached the first movement position and a YES-determination is made in step ST6 (for example, the conveying apparatus 1 has reached the position illustrated in FIG. 7B and a YES-determination is made in step ST6), the process advances to step ST7, and a distance measurement is performed on the pallet P by the fork pocket detection sensor 7 in a state where the conveying apparatus 1 stops at the first movement position. That is, a laser beam is emitted toward the side face of the pallet P (see an alternate long and short dash line in FIG. 7B illustrating an emission range of the laser beam), and reflection light from the side face of the pallet P is detected.

After the distance measurement is performed at the first movement position as such, the drive motor 24 is controlled so that the conveying apparatus 1 is moved toward the second movement position (step ST8).

In step ST9, it is determined whether the conveying apparatus 1 has reached the second movement position or not. When the conveying apparatus 1 has reached the second movement position and a YES-determination is made in step ST9 (for example, the conveying apparatus 1 has reached the position illustrated in FIG. 7C and a YES-determination is made in step ST9), the process advances to step ST10, and a distance measurement is performed on the pallet P by the fork pocket detection sensor 7 in a state where the conveying apparatus 1 stops at the second movement position. That is, a laser beam is emitted toward the side face of the pallet P (see an alternate long and short dash line in FIG. 7C illustrating an emission range of the laser beam), and reflection light from the side face of the pallet P is detected.

After the distance measurement is performed at the second movement position as such, the process advances to step ST11, and a synthetic image is formed by combining measurement results (pieces of distance-measurement information) acquired by the distance measurements. That is, the same image parts in an image acquired by the distance measurement at the first movement position and in an image acquired by the distance measurement at the second movement position are overlapped with each other, so as to form a synthetic image as one image. The synthetic image formed herein is an image from one of the fork pockets FP to a part between the fork pockets FP on the pallet side face.

After that, the process advances to step ST12, and a pallet model is formed from the synthetic image. That is, relative positions of the fork pockets FP on the side face of the pallet P are predefined, and therefore, when a position of one recessed portion that is estimated as one of the fork pockets FP is confirmed, a position of the other recessed portion that is estimated as the other one of the fork pockets FP is also confirmed.

Then, in step ST13, it is determined whether or not a dimension of the recessed portions estimated as the fork pockets FP (a longitudinal dimension, a lateral dimension, and the like of the recessed portions) falls within a predetermined range of a predefined dimension of the fork pockets FP, and when the dimension of the recessed portions falls within the predetermined range, it is determined that the recessed portions are the fork pockets FP. Hereby, the positions of the fork pockets FP are specified (step ST13).

One example of a predetermined range (a threshold based on which the fork pockets FP are determined) of a dimension of each part as a determination reference value in this case is as follows: a height dimension is set to a range from 50 mm to 80 mm; a width dimension is set to a range from 220 mm to 300 mm; and a dimension between the fork pockets (a horizontal dimension of a part between the fork pockets FP on the pallet side face) is set to a range from 190 mm to 380 mm.

Figure 8:
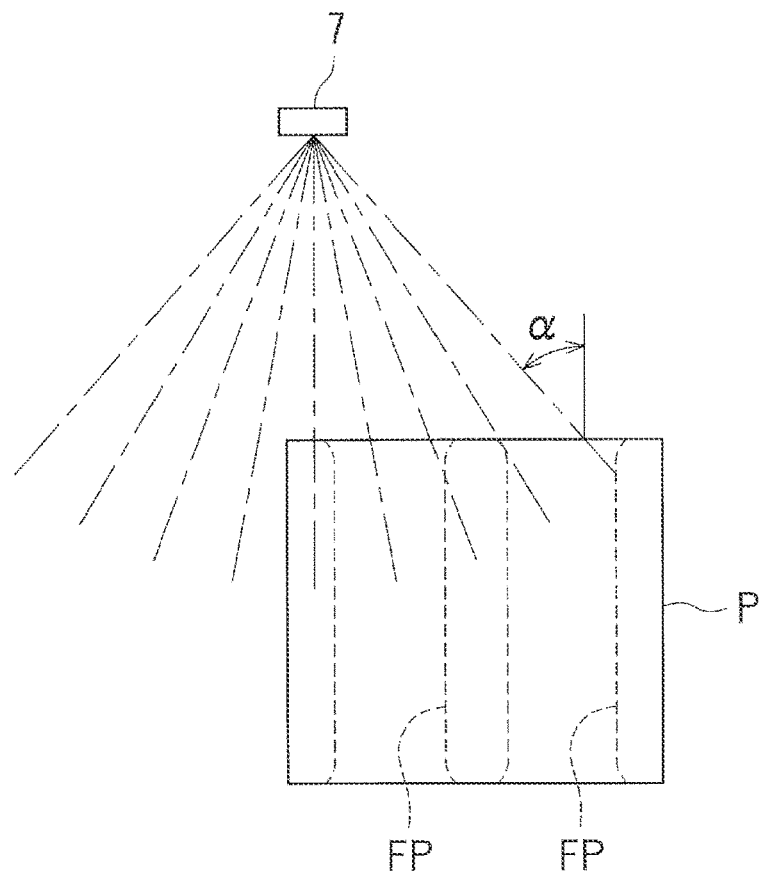
FIG. 8 is a plan view to describe an emission angle of a laser beam from a fork pocket detection sensor.
Figure 9:
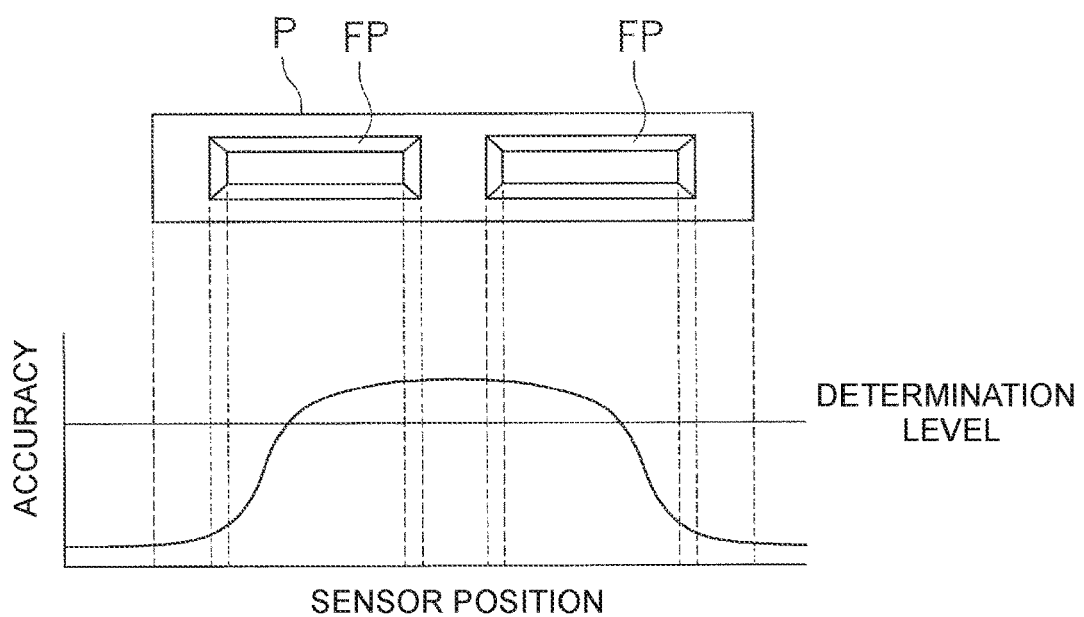
FIG. 9 is a view to describe detection accuracy of the fork pocket detection sensor with respect to each part of a pallet.
Figure 10:
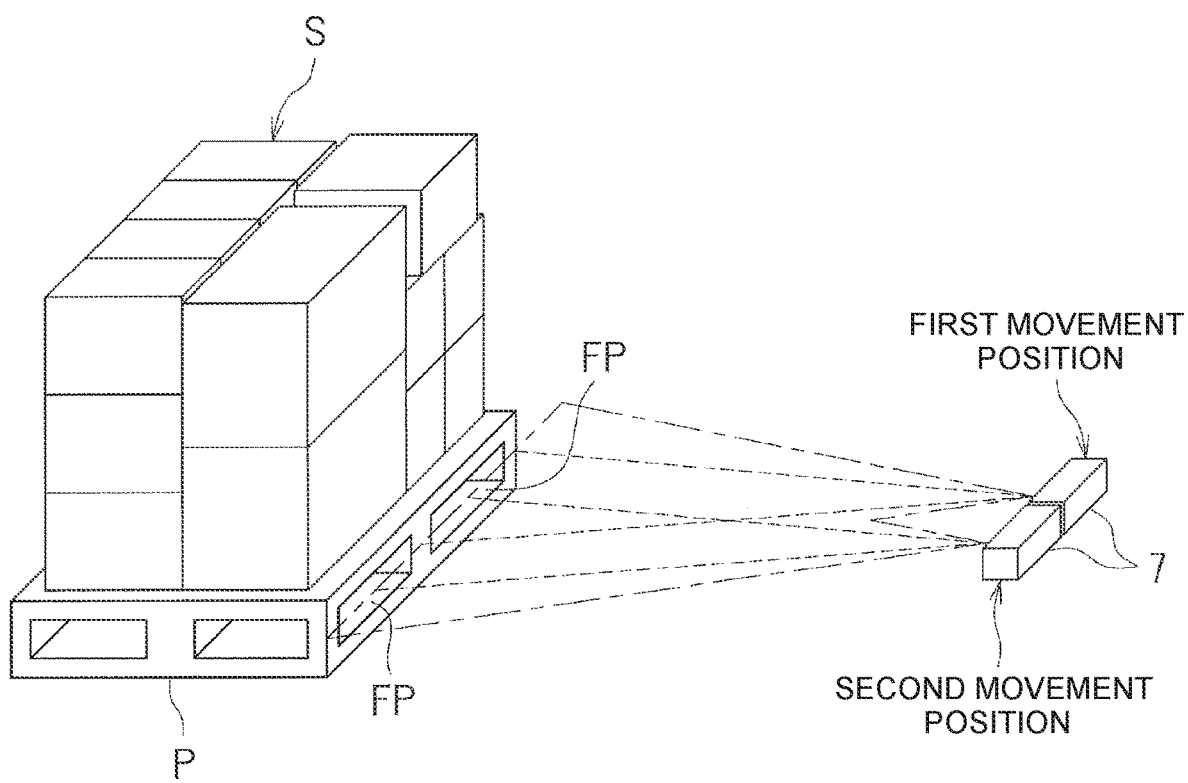
FIG. 10 is a perspective view illustrating respective emission ranges of the laser beam to a pallet side face at a first movement position and at a second movement position.

FIG. 8 is a plan view to describe an emission angle of the laser beam from the fork pocket detection sensor 7. As illustrated in this figure, the emission angle of the laser beam is small at a position that faces the fork pocket detection sensor 7, and the variation in reflection light of the laser beam is small, so that a high detection accuracy can be obtained. On the other hand, in a region distanced from the position that faces the fork pocket detection sensor 7, the emission angle of the laser beam is large (see an angle α in FIG. 8), and the variation in reflection light of the laser beam is also large, so that it is difficult to obtain a high detection accuracy. FIG. 9 is a view to describe detection accuracy of the fork pocket detection sensor 7 with respect to each part of the pallet P. As apparent from FIG. 9, inside a region between respective central positions of the fork pockets FP in the horizontal direction, a detection accuracy of a predetermined determination level or more can be obtained. However, the detection accuracy is not more than the predetermined determination level outside the region. FIG. 10 is a perspective view illustrating respective emission ranges of the laser beam to the side face of the pallet P at the first movement position and at the second movement position. The central position of each of the emission ranges is a position at which the detection accuracy of the determination level or more can be obtained in FIG. 9. In FIG. 10, a broken line indicates a range where the detection accuracy is the predetermined determination level or more in the emission range of the laser beam, and an alternate long and short dash line indicates a range where the detection accuracy is not more than the predetermined determination level outside the broken line. Thus, in the fork pocket specifying process, in either of the distance measurement at the first movement position and the distance measurement at the second movement position, the distance measurement is performed at a position at which the detection accuracy of the predetermined determination level or more can be obtained. Accordingly, a synthetic image obtained from images acquired from those distance measurements is highly accurate, thereby making it possible to specify the positions of the fork pockets FP with high accuracy.

After the positions of the fork pockets FP are specified as such, the process advances to step ST14, and coordinate information of the positions of the fork pockets FP is output to the control board 8.

The following describes the conveyance operation of the empty-box skid S after the positions of the fork pockets FP are specified as such.

Figure 11:
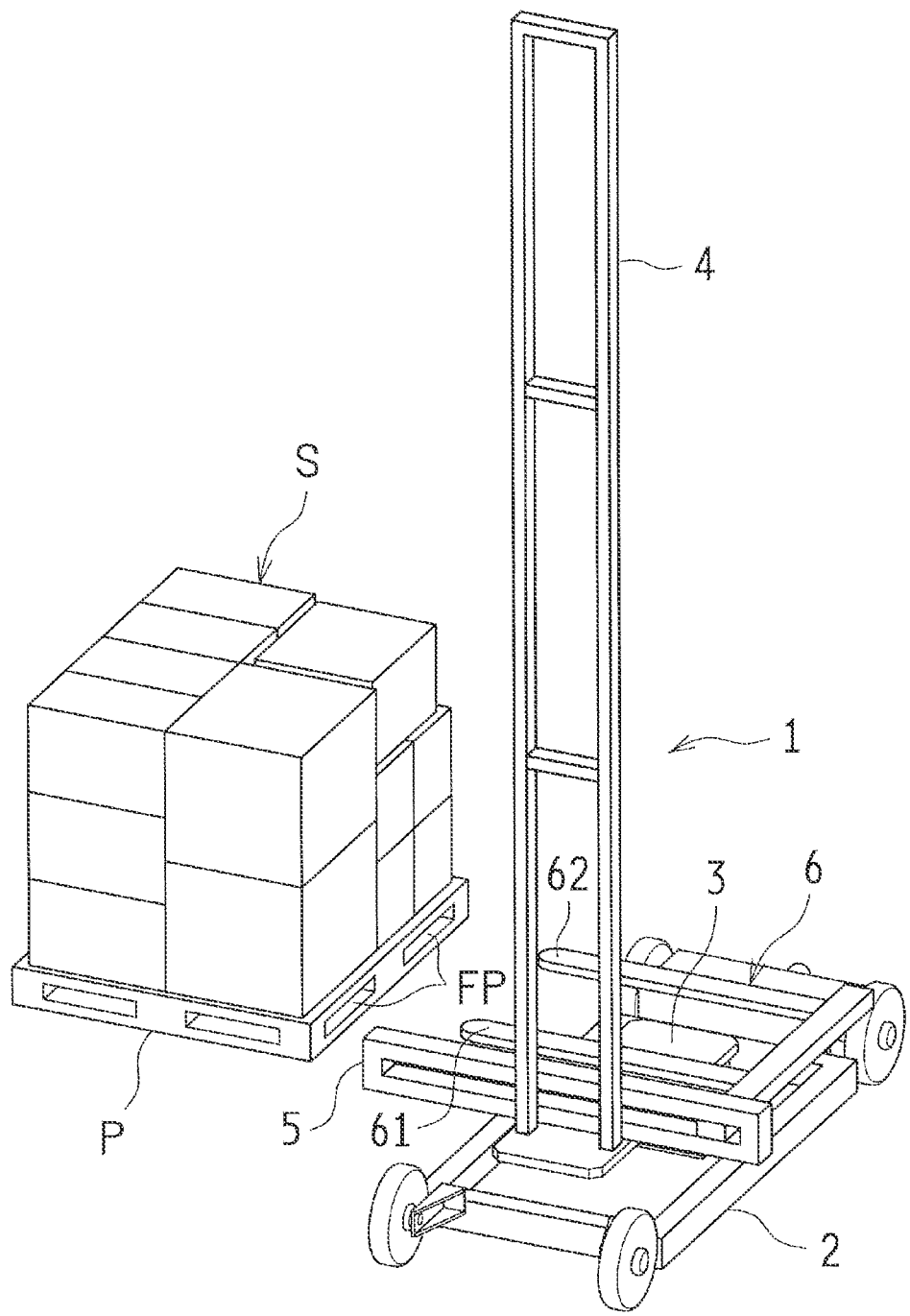
FIG. 11 is a perspective view illustrating a state where the conveying apparatus moves to a position at which the conveying apparatus faces an empty-box skid in an empty-box-skid receipt operation performed by the conveying apparatus.

FIG. 11 is a perspective view illustrating a state where the conveying apparatus 1 moves to the position at which the conveying apparatus 1 faces the empty-box skid S in the empty-box-skid receipt operation performed by the conveying apparatus 1 (the conveyance wagon CC is not illustrated in FIG. 11).

After the conveying apparatus 1 moves to the position at which the conveying apparatus 1 faces the conveyance wagon CC on which the empty-box skid S to be conveyed is placed as such, the sliding mechanism 5 moves up and down along the extending direction of the support 4 along with the operation of the raising-lowering motor 54 so that the fork 6 is moved to a position at which the fork 6 faces the pallet P (a position at which the blades 61, 62 of the fork 6 are insertable into the fork pockets FP).

Figure 12:
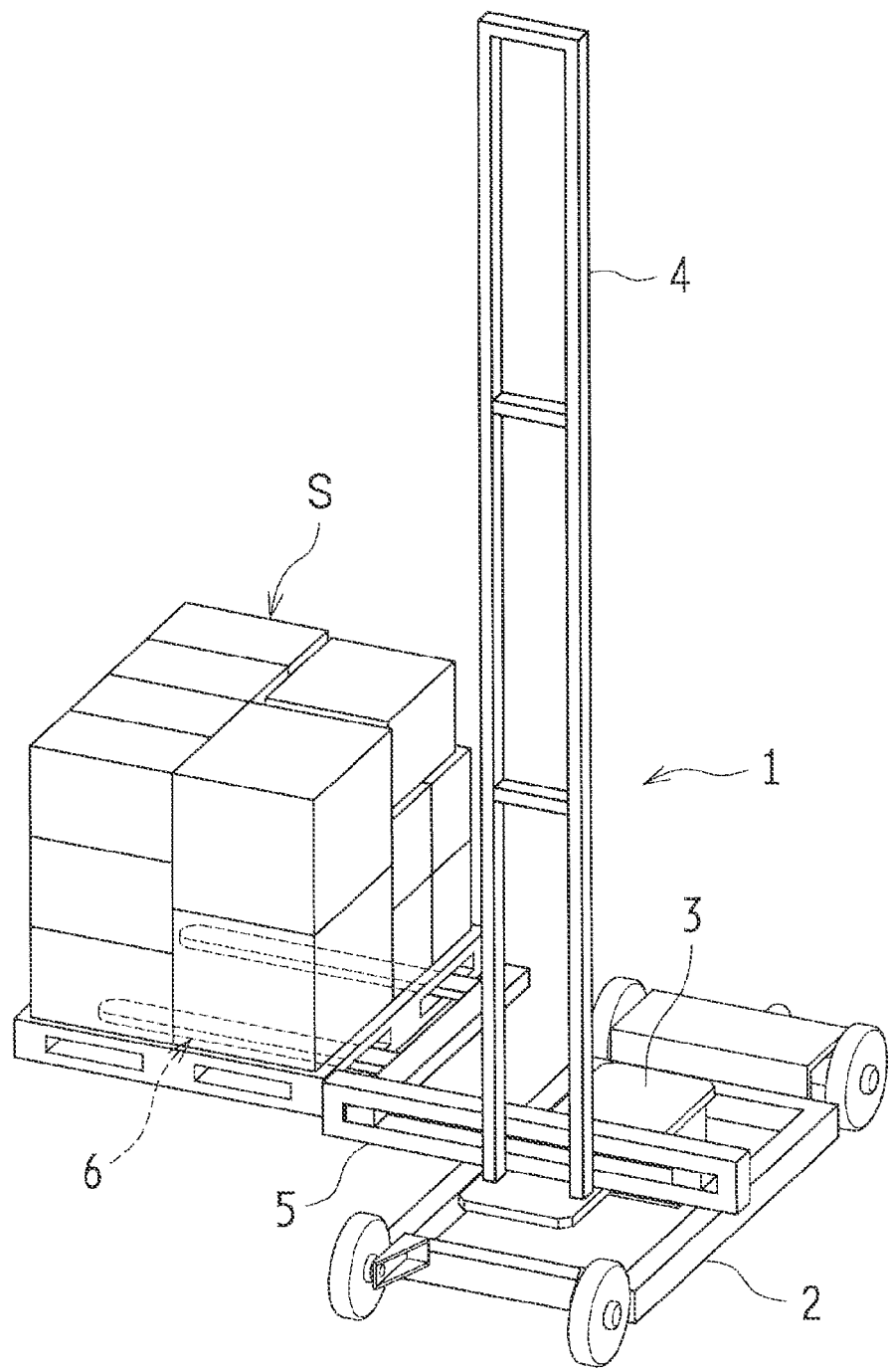
FIG. 12 is a perspective view illustrating a state where a fork slides to an advance position in the empty-box-skid receipt operation performed by the conveying apparatus.

After that, along with the operation of the slide motor 55, the fork 6 is slid to the advance position (a position at which the empty-box skid S is received; the position at which the blades 61, 62 of the fork 6 are inserted into the fork pockets FP), and hereby, the fork 6 holds the empty-box skid S (in practice, the fork 6 slightly moves upward due to the operation of the raising-lowering motor 54 so that the empty-box skid S is lifted up and held by the fork 6). FIG. 12 is a perspective view illustrating a state where the fork 6 slides to the advance position in the empty-box-skid receipt operation performed by the conveying apparatus 1 (the conveyance wagon CC is not illustrated in FIG. 12).

Figure 13:
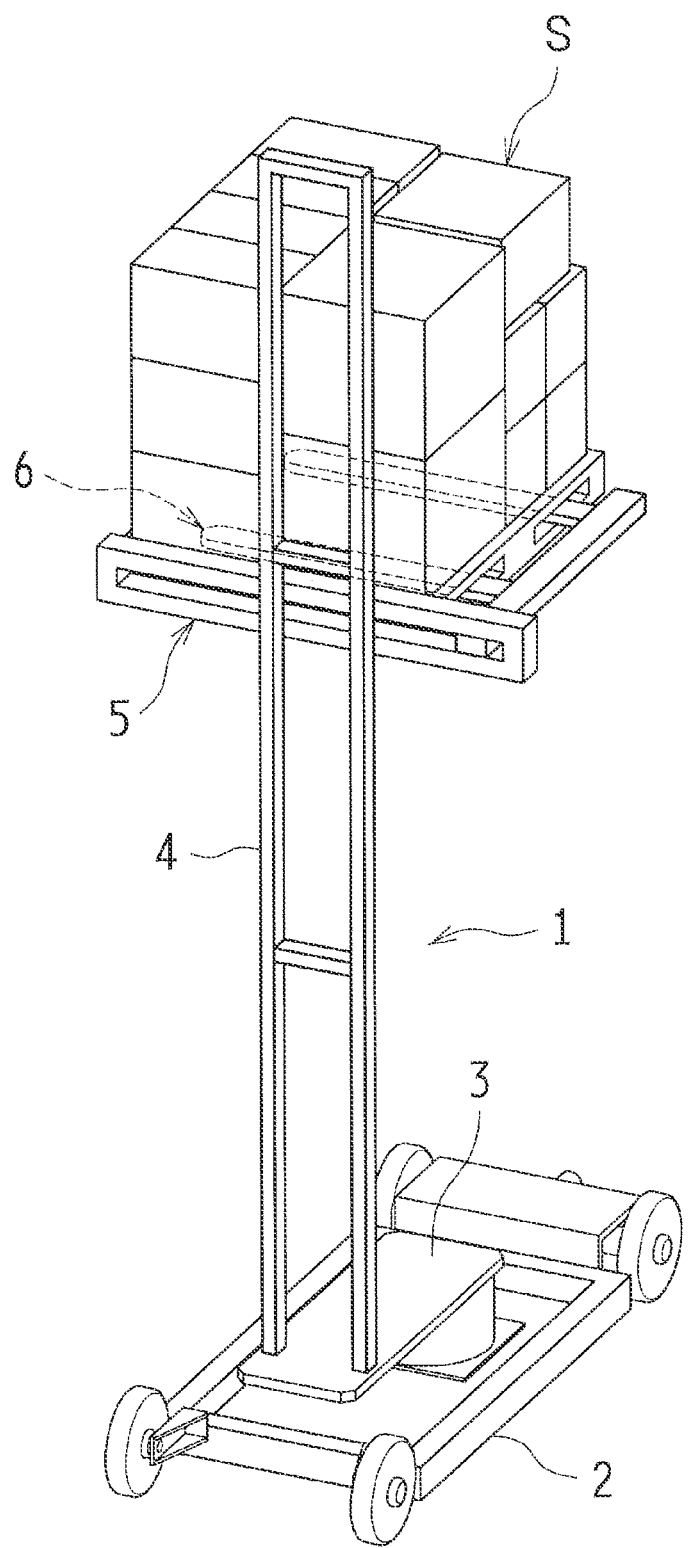
FIG. 13 is a perspective view illustrating a state where the fork slides to a retreat position and a sliding mechanism moves upward in the empty-box-skid receipt operation performed by the conveying apparatus.

In a state where the fork 6 holds the empty-box skid S as such, the fork 6 is slid to the retreat position (a position at which the empty-box skid S is placed on the swivel base 3) along with the operation of the slide motor 55. Further, the sliding mechanism 5 moves upward along the extending direction of the support 4 along with the operation of the raising-lowering motor 54, and the empty-box skid S also moves upward along with this. FIG. 13 is a perspective view illustrating a state where the fork 6 slides to the retreat position and the sliding mechanism 5 moves upward in the empty-box-skid receipt operation performed by the conveying apparatus 1. As a control on the raising-lowering motor 54 at this time, the empty-box skid S and the sliding mechanism 5 are moved upward to a height position at which the empty-box skid S and the sliding mechanism 5 do not interfere with the handle CC1 of the conveyance wagon CC, and the like. Note that an up-movement position of the sliding mechanism 5 is predefined because a height position of the handle CC1 is predefined.

Moving Operation of Conveying Apparatus

In the moving operation of the conveying apparatus 1, the wheels 22 rotate along with the operation of the drive motor 24, so that the conveying apparatus 1 moves to a position at which the conveying apparatus 1 faces the empty-box skid chute SS to which the empty-box skid S held by the conveying apparatus 1 is to be discharged. For example, the conveying apparatus 1 moves to a position at which the conveying apparatus 1 faces the empty-box skid chute SS placed on the near side in FIG. 5, for example.

Empty-Box-Skid Discharge Operation

In the empty-box-skid discharge operation, the turning operation of the swivel base 3, the raising-lowering operation of the sliding mechanism 5, and the sliding operation of the fork 6 are performed.

Figure 14:
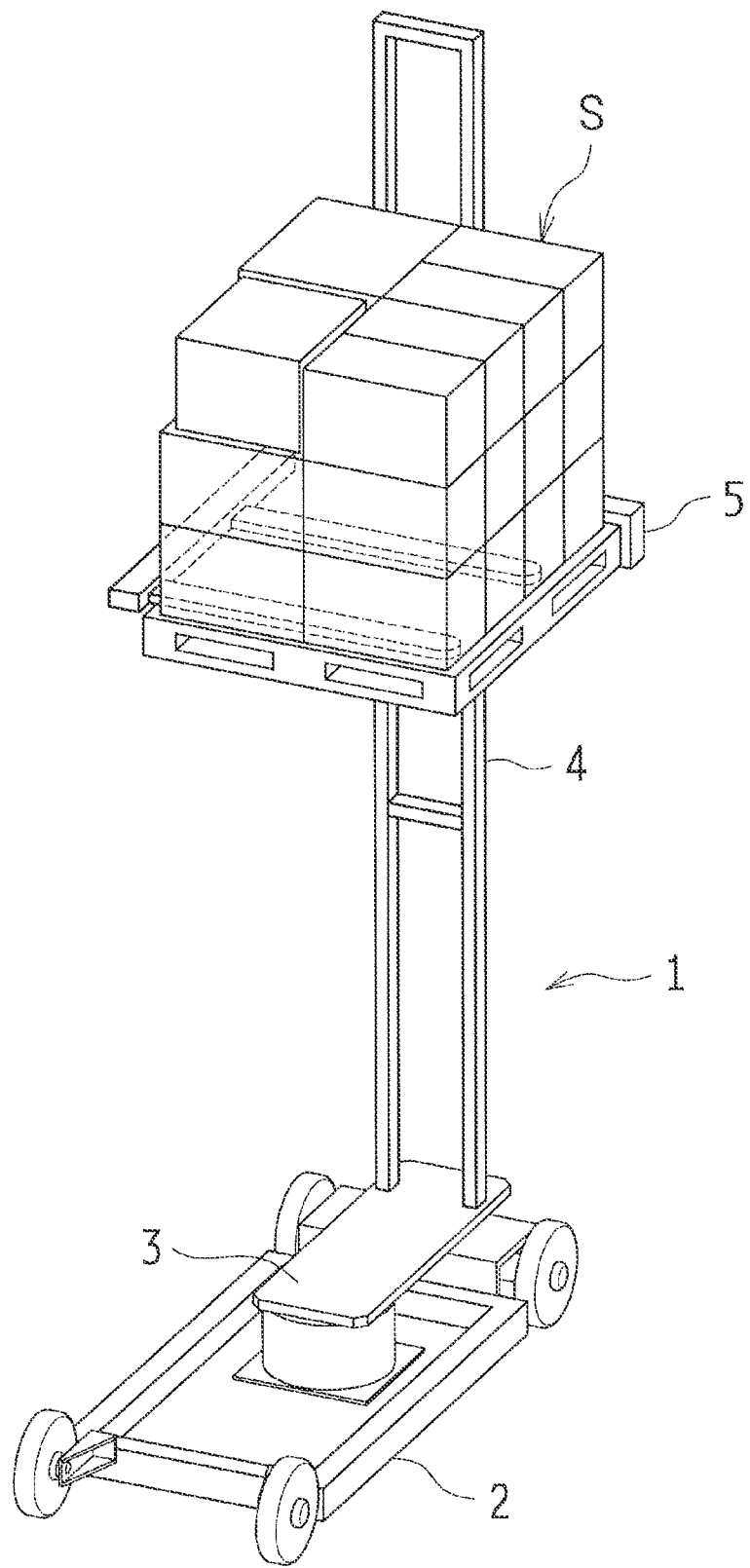
FIG. 14 is a perspective view illustrating a state at the time when turning of a swivel base is completed.

In the turning operation of the swivel base 3, the swivel base 3 is turned by 180° so that the empty-box skid S faces the empty-box skid chute SS side. That is, the turning motor 32 is operated, so that a rotational power output from the turning motor 32 is transmitted to the follower sprocket 33 via the power transmission mechanism, so that the swivel base 3 is rotated around the vertical axis (the Z axis). FIG. 14 is a perspective view illustrating a state at the time when the turning of the swivel base 3 is completed.

In the raising-lowering operation of the sliding mechanism 5, the number of stages of the empty-box skids S placed on the empty-box skid conveyer SC of the empty-box skid chute SS on which the empty-box skid S is to be placed is grasped, and a raised-lowered position of the sliding mechanism 5 is determined in accordance with the number of stages. More specifically, the control board 8 receives an output signal from the empty-box skid conveyer controlling portion 83, so that the control board 8 grasps the number of current stages of the empty-box skids S placed on the empty-box skid conveyer SC (for example, the number of current stages of the empty-box skids S placed on the empty-box skid chute SS placed on the near side in FIG. 5). That is, the sliding mechanism 5 is moved up and down by the control of the raising-lowering motor 54 in accordance with each of the following cases: a case where no empty-box skid S is placed on the empty-box skid conveyer SC; a case where one empty-box skid S is placed on the empty-box skid conveyer SC; a case where the empty-box skids S are placed in two stages on the empty-box skid conveyer SC; and a case where the empty-box skids S are placed in three stages on the empty-box skid conveyer SC. At this time, the sliding mechanism 5 is moved up and down so that a bottom-face height position of the empty-box skid S currently held by the conveying apparatus 1 corresponds to a top-face height position in the empty-box skid conveyer SC (a top-face height position of the empty-box skid conveyer SC in the case where no empty-box skid S is placed on the empty-box skid conveyer SC; a top-face height position of the uppermost empty-box skid S in a case where one or more empty-box skids S are placed on the empty-box skid conveyer SC).

Figure 15:
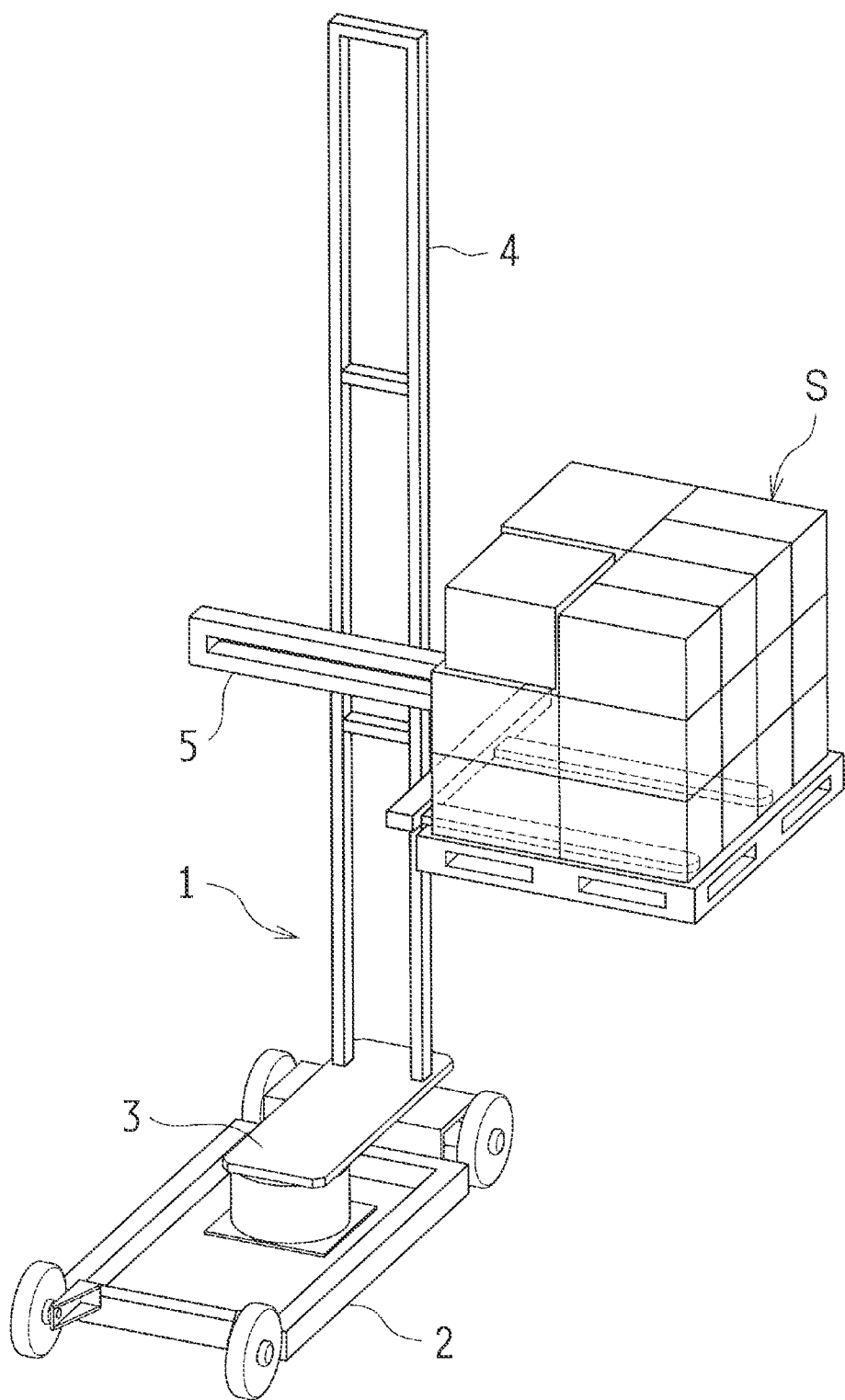
FIG. 15 is a perspective view illustrating a state where the sliding mechanism moves downward and the fork slides to the advance position in an empty-box-skid discharge operation performed by the conveying apparatus.

In the sliding operation of the fork 6, along with the operation of the slide motor 55, the fork 6 is slid to the advance position (a position at which the empty-box skid S is discharged; a position at which the fork 6 is moved forward to above the empty-skid conveyer SC), and hereby, the empty-box skid S is discharged to the empty-box skid conveyer SC (in practice, the fork 6 slightly moves downward due to the operation of the raising-lowering motor 54 so that the empty-box skid S is placed onto the empty-skid conveyer SC). FIG. 15 is a perspective view illustrating a state where the sliding mechanism 5 moves downward to a predetermined position and the fork 6 slides to the advance position in the empty-box-skid discharge operation performed by the conveying apparatus 1 (the empty-box skid chute SS is not illustrated in FIG. 15).

Figure 16:
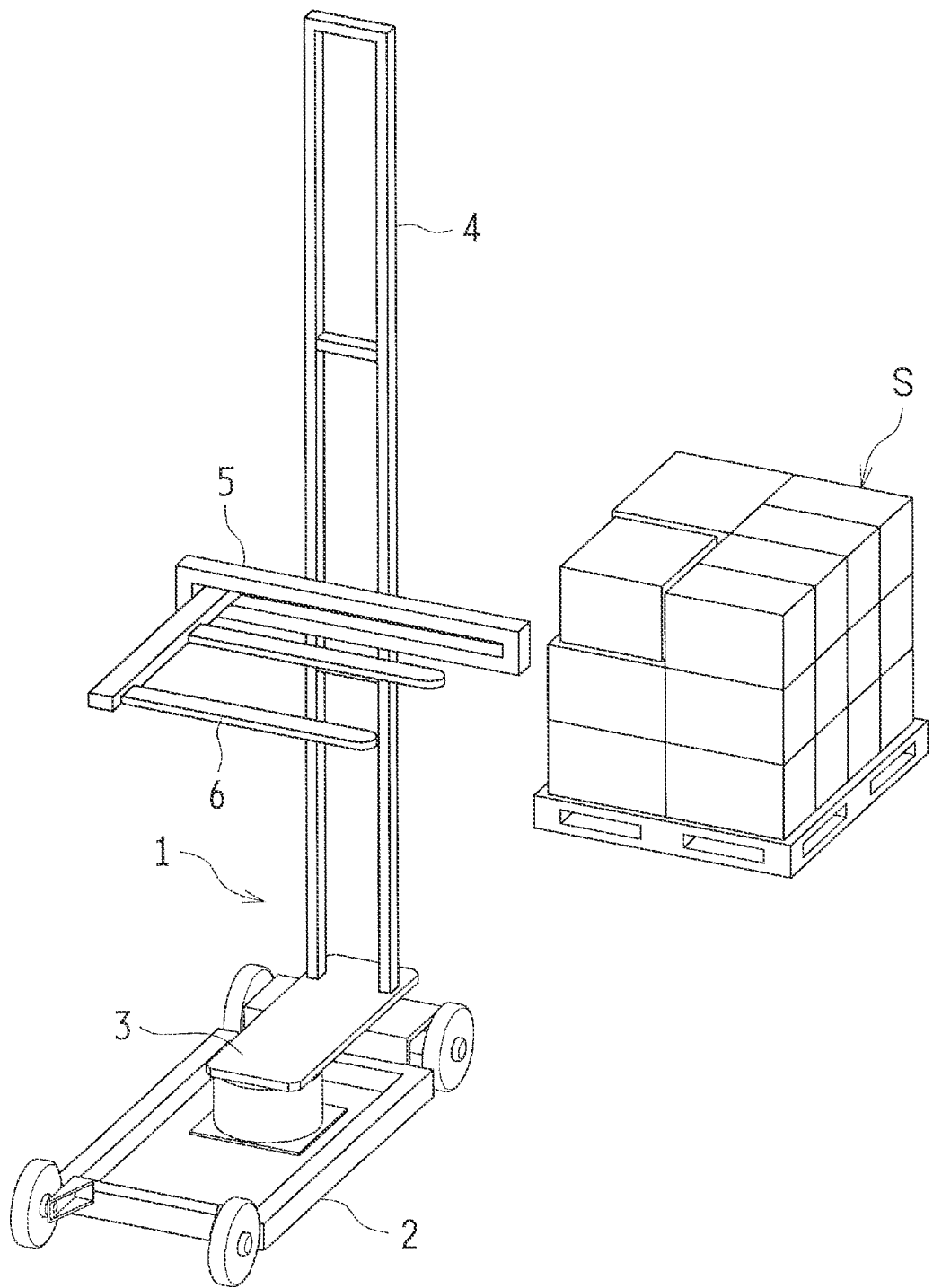
FIG. 16 is a perspective view illustrating a state where the fork slides to the retreat position in the empty-box-skid discharge operation performed by the conveying apparatus.

In a state where the empty-box skid S is placed on the empty-box skid conveyer SC as such, the fork 6 is slid to the retreat position along with the operation of the slide motor 55. That is, the blades 61, 62 of the fork 6 are pulled out from the fork pockets FP. FIG. 16 is a perspective view illustrating a state where the fork 6 slides to the retreat position in the empty-box-skid discharge operation performed by the conveying apparatus 1 (the empty-box skid chute SS is not illustrated in FIG. 16).

As described above, the operation of conveying one empty-box skid S from the conveyance wagon CC to the predetermined empty-box skid chute SS is completed. After that, similarly, after the fork pocket specifying process is performed, an operation of conveying another empty-box skid S from the conveyance wagon CC to a predetermined empty-box skid chute SS is performed, and the operation is repeated.

Effects of Embodiment

In the present embodiment, respective distance measurements are performed by the fork pocket detection sensor 7 at the position at which the fork pocket detection sensor 7 faces one of the fork pockets FP and at the position at which the fork pocket detection sensor 7 faces the central position in the horizontal direction between the fork pockets FP on the pallet side face, and information obtained by combining pieces of distance-measurement information acquired by the respective distance measurements is compared with information of the predefined shapes of the fork pockets FP, so as to specify the positions of the fork pockets FP. On this account, it is not necessary to individually detect respective positions of the fork pockets after the whole pallet side face is recognized. As a result, it is possible to accurately detect the positions of the fork pockets FP without causing a decrease of conveyance efficiency.

Further, in the fork pocket specifying process, in a case where the distance measurement is performed at the second movement position after the distance measurement is performed at the first movement position, the distance measurement is performed in a state where the fork pocket detection sensor 7 faces the central position in the horizontal direction between the fork pockets FP on the pallet side face, and then, the positions of the fork pockets FP are specified. Accordingly, after that, a moving distance of the conveying apparatus 1 can be made short at the time when the conveying apparatus 1 is moved to a position at which the blades 61, 62 face the fork pockets FP, respectively. That is, it is possible to shorten time after the distance measurement is performed at the second movement position until the blades 61, 62 are inserted into the fork pockets FP, respectively, thereby making it possible to contribute to an improvement of the conveyance efficiency.

Further, in the present embodiment, the fork pocket detection sensor 7 is attached to the swivel base 3 at a height position predefined so that the fork pocket detection sensor 7 faces the side face of the pallet P. On this account, the fork pocket detection sensor 7 can face the side face of the pallet P regardless of the raised-lowered position of the fork 6, thereby making it possible to cause the fork pocket detection sensor 7 to successfully face the side face of the pallet P at the first movement position and at the second movement position only by the control on the drive motor 24 by the first movement control portion 87. This also makes it possible to achieve simplification of the control for the distance measurement at each part.

Other Embodiments

Note that the disclosure is not limited to the above embodiment, and all modifications and alterations within the scope of Claims and within a scope equivalent thereto are performable.

For example, the above embodiment deals with a case where the disclosure is applied to the conveying apparatus 1 used to convey the empty-box skid S from the conveyance wagon CC to the empty-box skid chute SS in the empty-box return station ST in the automobile production factory. The conveying apparatus 1 according to the disclosure is not limited to this and can be used in a production factory other than the automobile production factory. Further, the conveying apparatus 1 of the disclosure is also applicable to an apparatus for conveying a skid configured such that component boxes in which components are accommodated are placed on a pallet (a skid on which delivered component boxes are placed).

Further, in the above embodiment, the fork pocket detection sensor 7 is constituted by a laser sensor but may be constituted by an infrared sensor. Further, the detection technique in the fork pocket detection sensor 7 is not limited to the TOF method, and various detection techniques such as a stereovision method are also applicable.

The disclosure is applicable to a conveying apparatus configured to convey an empty-box skid from a conveyance wagon to an empty-box skid chute.

What is claimed is:

1. A conveying apparatus including a distance measurement sensor and a movement power source and configured to convey packages together with a pallet in such a manner that positions of right and left fork pockets provided in a pair on a side face of the pallet on which the packages are placed are detected based on an output from the distance measurement sensor, the conveying apparatus is moved by the movement power source to a position at which blades of a fork face the fork pockets, respectively, and the blades are inserted into the fork pocket, respectively, the conveying apparatus comprising:

a first movement control portion configured to control the movement power source so that the conveying apparatus is placed at a first movement position at which the distance measurement sensor faces one of the fork pockets or the conveying apparatus is placed at a second movement position at which the distance measurement sensor faces a central position in a horizontal direction between the fork pockets on the side face of the pallet;

a fork pocket specifying portion configured to specify the positions of the fork pockets by comparing, with information of predefined shapes of the fork pockets, information formed by combining distance-measurement information acquired by a distance measurement performed on the pallet by the distance measurement sensor at the first movement position and distance-measurement information acquired by a distance measurement performed on the pallet by the distance measurement sensor at the second movement position; and a second movement control portion configured to control the movement power source so that the conveying apparatus moves to a position at which the blades respectively face the fork pockets the positions of which are specified by the fork pocket specifying portion.

2. The conveying apparatus according to claim 1, wherein:
the distance measurement sensor is configured to emit light for distance measurement toward the pallet through a region between the blades of the fork in a plan view; and
the first movement control portion is configured to control the movement power source so that the conveying apparatus moves to the second movement position after the distance measurement is performed by the distance measurement sensor at the first movement position.

3. The conveying apparatus according to claim 1, wherein the fork pocket specifying portion is configured to
form a pallet model having hole portions estimated as the fork pockets by combining the pieces of distance-measurement information,
compare dimensions of the hole portions in the pallet model with a dimension range approximate to predefined dimensions of the fork pockets, and
specify positions of the hole portions as the positions of the fork pockets with a proviso that the dimensions of the hole portions in the pallet model fall within the approximate dimension range.

4. The conveying apparatus according to claim 1, wherein:
a pallet placement lane on which a plurality of pallets is arranged is adjacent to a conveying apparatus lane where the conveying apparatus moves along the pallet placement lane; and
when each of the distance measurements is to be performed on the pallet by the distance measurement sensor, the conveying apparatus stops at a corresponding one of the first movement position and the second movement position on the conveying apparatus lane.

5. The conveying apparatus according to claim 1, wherein the distance measurement sensor is fixed at a height position predefined so that the distance measurement sensor faces the side face of the pallet.

* * * * *